United States Patent
Mochizuki et al.

(10) Patent No.: US 10,486,101 B2
(45) Date of Patent: Nov. 26, 2019

(54) GAS SEPARATION MEMBRANE, GAS SEPARATION MEMBRANE MODULE, AND GAS SEPARATION DEVICE

(71) Applicant: FUJIFILM Corporation, Tokyo (JP)

(72) Inventors: Yusuke Mochizuki, Kanagawa (JP); Atsushi Mukai, Kanagawa (JP); Motoi Harada, Kanagawa (JP); Makoto Sawada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/186,606

(22) Filed: Nov. 12, 2018

(65) Prior Publication Data
US 2019/0076777 A1 Mar. 14, 2019

Related U.S. Application Data

(63) Continuation of application No. PCT/JP2017/023880, filed on Jun. 29, 2017.

(30) Foreign Application Priority Data

Jul. 25, 2016 (JP) .................. 2016-145267

(51) Int. Cl.
*B01D 53/22* (2006.01)
*B01D 69/12* (2006.01)
(Continued)

(52) U.S. Cl.
CPC .......... *B01D 53/22* (2013.01); *B01D 53/228* (2013.01); *B01D 69/12* (2013.01); *B01D 71/40* (2013.01);
(Continued)

(58) Field of Classification Search
CPC ................ B01D 71/40; B01D 2256/18; B01D 2257/404; B01D 2256/20; B01D 2256/12;
(Continued)

(56) References Cited

U.S. PATENT DOCUMENTS

| 4,655,807 A | 4/1987 | Ohmori et al. |
| 5,183,534 A * | 2/1993 | Fjare ......................... C08J 7/12 216/83 |

(Continued)

FOREIGN PATENT DOCUMENTS

| EP | 0649676 | 4/1995 |
| JP | S60118217 | 6/1985 |

(Continued)

OTHER PUBLICATIONS

"International Search Report (Form PCT/ISA/210) of PCT/JP2017/023880," dated Aug. 15, 2017, with English translation thereof, pp. 1-5.

(Continued)

*Primary Examiner* — Anthony R Shumate
(74) *Attorney, Agent, or Firm* — JCIPRNET

(57) ABSTRACT

A gas separation membrane, the gas separation membrane module, and the gas separation device include a first separation layer, and a second separation layer, the first separation layer has an Si/C ratio of 0.3 or less, the Si/C ratio being a ratio of the number of silicon atoms to the number of carbon atoms at the interface of the first separation layer on the second separation layer side, the second separation layer has a maximum value of an F/C ratio of 0.20 or more, the F/C ratio being a ratio of the number of fluorine atoms to the number of carbon atoms, and an Si/C ratio of 0.3 or less in a portion where the F/C ratio is maximum.

17 Claims, 2 Drawing Sheets

(51) Int. Cl.
*B01D 71/40* (2006.01)
*B01D 69/02* (2006.01)
*B01D 71/10* (2006.01)
*B01D 71/32* (2006.01)
*B01D 71/64* (2006.01)
*B01D 71/70* (2006.01)

(52) U.S. Cl.
CPC .............. *B01D 69/02* (2013.01); *B01D 71/10* (2013.01); *B01D 71/32* (2013.01); *B01D 71/64* (2013.01); *B01D 71/70* (2013.01); *B01D 2256/10* (2013.01); *B01D 2256/12* (2013.01); *B01D 2256/16* (2013.01); *B01D 2256/18* (2013.01); *B01D 2256/20* (2013.01); *B01D 2256/24* (2013.01); *B01D 2256/245* (2013.01); *B01D 2257/302* (2013.01); *B01D 2257/304* (2013.01); *B01D 2257/308* (2013.01); *B01D 2257/404* (2013.01); *B01D 2257/504* (2013.01); *B01D 2325/04* (2013.01)

(58) Field of Classification Search
CPC .................................................. B01D 71/64; B01D 2256/16; B01D 2256/24; B01D 69/12; B01D 2257/504; B01D 2257/308; B01D 53/22; B01D 2256/10; B01D 71/70; B01D 53/228; B01D 71/10; B01D 2256/245; B01D 2325/04; B01D 71/32; B01D 2257/304; B01D 2257/302; B01D 69/02

See application file for complete search history.

(56) References Cited

U.S. PATENT DOCUMENTS

| | | | | |
|---|---|---|---|---|
| 5,543,442 | A * | 8/1996 | Hiratani | C08G 73/1039 523/106 |
| 5,649,045 | A * | 7/1997 | Fjare | G02B 1/046 385/145 |
| 5,658,669 | A | 8/1997 | Althoff et al. | |
| 5,972,080 | A | 10/1999 | Nagata | |
| 6,500,603 | B1 * | 12/2002 | Shioda | G02B 6/138 264/1.24 |
| 9,493,614 | B2 * | 11/2016 | Wakita | C08G 73/1007 |
| 2002/0085825 | A1 * | 7/2002 | Kishimoto | G02B 6/1221 385/130 |
| 2005/0074207 | A1 * | 4/2005 | Shioda | G02B 6/122 385/31 |
| 2009/0092759 | A1 * | 4/2009 | Chen | C08G 73/101 427/384 |
| 2014/0138317 | A1 | 5/2014 | Liu et al. | |
| 2014/0150646 | A1 | 6/2014 | Liu et al. | |
| 2016/0002407 | A1 * | 1/2016 | Wakita | C08G 73/106 257/40 |
| 2016/0220966 | A1 | 8/2016 | Kano et al. | |
| 2016/0354731 | A1 | 12/2016 | Mochizuki | |
| 2018/0033612 | A1 * | 2/2018 | Lee | G03F 1/0069 |
| 2018/0328422 | A1 * | 11/2018 | Ohgata | F16D 48/10 |
| 2019/0071520 | A1 * | 3/2019 | Baileykobayashi | C07K 17/08 |
| 2019/0091635 | A1 * | 3/2019 | Mukai | B01D 69/10 |

FOREIGN PATENT DOCUMENTS

| | | |
|---|---|---|
| JP | H05329343 | 12/1993 |
| JP | H07251046 | 10/1995 |
| JP | H07308555 | 11/1995 |
| JP | H0852332 | 2/1996 |
| JP | H1085571 | 4/1998 |
| JP | 2013017988 | 1/2013 |
| JP | 2013031852 | 2/2013 |
| JP | 2014014808 | 1/2014 |
| JP | 2015073980 | 4/2015 |
| JP | 2015160167 | 9/2015 |
| JP | 2015160201 | 9/2015 |
| JP | 2016503448 | 2/2016 |
| WO | 2016047351 | 3/2016 |

OTHER PUBLICATIONS

"Written Opinion of the International Searching Authority (Form PCT/ISA/237) of PCT/JP2017/023880," dated Aug. 15, 2017, with English translation thereof, pp. 1-14.

Loyd S. White, et al., "Properties of a polyimide gas separation membrane in natural gas streams," Journal of Membrane Science, vol. 103, Jul. 1995, pp. 73-82.

* cited by examiner

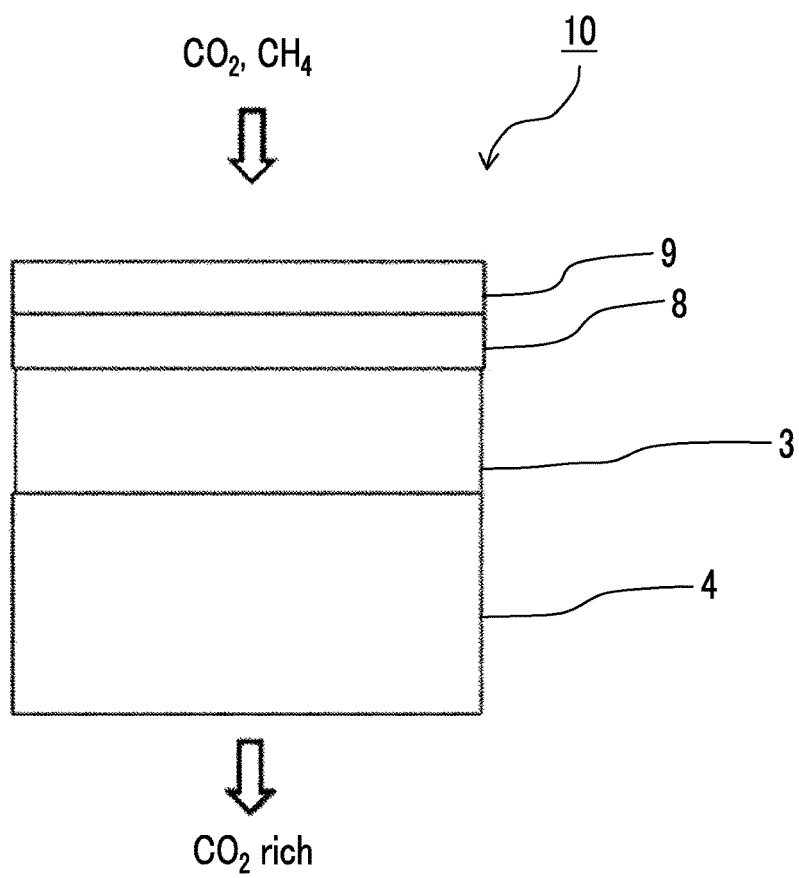
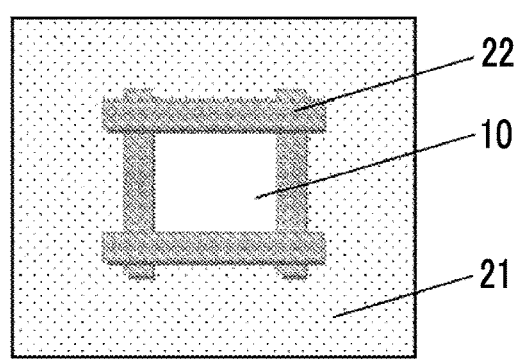

GAS SEPARATION MEMBRANE, GAS SEPARATION MEMBRANE MODULE, AND GAS SEPARATION DEVICE

CROSS-REFERENCE TO RELATED APPLICATIONS

This application is a Continuation of PCT International Application No. PCT/JP2017/023880, filed on Jun. 29, 2017, which claims priority under 35 U.S.C. § 119(a) to Japanese Patent Application No. 2016-145267, filed on Jul. 25, 2016. Each of the above application(s) is hereby expressly incorporated by reference, in its entirety, into the present application.

BACKGROUND OF THE INVENTION

1. Field of the Invention

The present invention relates to a gas separation membrane, a gas separation membrane module, and a gas separation device.

2. Description of the Related Art

A material formed of a polymer compound has a gas permeability specific to the material. Based on this property, it is possible to cause selective permeation and separation of a target gas component using a membrane formed of a specific polymer compound. As an industrial use aspect of this gas separation membrane, in relation to a global warming issue, a study has been conducted for separating and recovering carbon dioxide from a large-scale carbon dioxide source in a thermal power station, a cement plant, a blast furnace in a steel plant or the like. Further, this membrane separation technique has been attracting attention as means for solving environmental issues which can be achieved with relatively little energy. In addition, the technique is used as means for removing carbon dioxide from natural gas mainly including methane and carbon dioxide or biogas (gas generated due to fermentation and anaerobic digestion of biological excrement, organic fertilizers, biodegradable substances, sewage, garbage, energy crops, or the like).

The following methods are known to secure gas permeability and gas separation selectivity by making a site contributing to gas separation into a thin layer to be used as a practical gas separation membrane. A method of making a portion contributing to separation serving as an asymmetric membrane into a thin layer which is referred to as a skin layer, a method of using a thin layer composite membrane (thin film composite) provided with a thin film layer (selective layer) contributing to gas separation on a support having mechanical strength, or a method of using hollow fibers including a layer which contributes to gas separation and has high density is known.

As gas separation membranes, there are known gas separation membranes having a membrane including a fluorine atom (refer to JP1996-052332A (JP-H08-052332A), JP1995-308555A (JP-H07-308555A), JP1993-329343A (JP-H05-329343A), JP1985-118217A (JP-S60-118217A), JP2016-503448A, and JP2013-017988A).

JP1996-052332A (JP-H08-052332A) discloses a composite gas separation membrane which is formed of two kinds of polyimide resin layers having different molecular structures different in solubility with respect to an organic solvent, in which the two layers are laminated substantially independently or through a mixed layer, the first polyimide resin layer is formed of a porous polyimide support membrane of which the nitrogen gas permeation flux at 25° C. is at least 2 $Nm^3/m^2/h/atm$, and the second polyimide resin layer contributes to gas separation performance and is formed of a fluorine-containing polyimide thin film having at least three fluorine atoms in a repeating molecular structure unit constituting the second polyimide resin layer.

JP1995-308555A (JP-H07-308555A) discloses a composite membrane which includes a porous support (A) and a fluorine-containing permselective layer (C) which is a copolymer, in which the thickness of the layer (C) is 10 to 500 nm, the copolymer of the layer (C) includes 10% to 80% by mole of a vinyl ester monomer units, 5% to 50% by mole of a hydroxyl group-containing monomer unit, and at least 10% by mole of (c) fluoroolefin, and hydroxyl containing chains are crosslinked with each other.

JP1993-329343A (JP-H05-329343A) discloses a gas separation resin membrane which is formed of a fluorocopolymer having a sulfonamide group and allows carbon dioxide and/or hydrogen sulfide to selectively permeate.

JP1985-118217A (JP-S60-118217A) discloses a gas separation membrane which is formed of a fluorine-containing acrylic acid derived polymer or a crosslinked product thereof.

JP2016-503448A discloses a polymer blended membrane including a fluorinated ethylene-propylene copolymer including 10% to 99% by mole of a 2,3,3,3-tetrafluoropropene-based structural unit and 1% to 90% by mole of a vinylidene fluoride-based structural unit, and a second polymer different from the fluorinated ethylene-propylene copolymer.

SUMMARY OF THE INVENTION

The typical performance of a gas separation membrane is gas separation selectivity in a case where a desired gas is obtained from a mixed gas.

The present inventors have examined the performance of a conventional gas separation membrane having a membrane including a fluorine atom and have found that further improvement in gas separation selectivity is required.

On the other hand, as a gas separation membrane having high gas separation selectivity, gas separation membranes formed of polyimides, gas separation membranes formed of celluloses, and the like are known.

For example, JP2013-017988A discloses that it is possible to obtain a gas separation membrane which is a gas separation membrane formed of a specific aromatic polyimide and has high gas separation performance with respect to a mixed gas of carbon dioxide gas and methane gas.

However, it is known that a separation layer having high gas separation selectivity (particularly a separation layer including polyimide) is plasticized by BTX (benzene, toluene, xylene) and a higher order hydrocarbon gas such as propane, butane, or hexane and the performance is deteriorated. For example, in Journal of Membrane Science, 103 (1995), pp. 73 to 82, deterioration in $CO_2$ and $CH_4$ gas separation selectivity accompanying plasticization of a separation layer including polyimide due to hexane or toluene is described.

Therefore, in a case where a higher order hydrocarbon gas is contained in a gas to be separated, the gas separation selectivity may be decreased after exposure to an impurity gas. In a case where the gas separation membrane is implemented in the real gas field, the impurity gas compositions are different in each gas field and thus there arises a problem that the gas separation selectivity is significantly decreased depending on impurity gases.

As described above, a gas separation membrane which has high gas separation selectivity and is suppressed in decrease of gas separation selectivity after exposure to an impurity gas has not been known in practice.

An object to be achieved by the present invention is to provide a gas separation membrane which has high gas separation selectivity and is suppressed in decrease of gas separation selectivity after exposure to an impurity gas.

Another object to be achieved by the present invention is to provide a gas separation membrane module having a gas separation membrane which has high gas separation selectivity and is suppressed in decrease of gas separation selectivity after exposure to an impurity gas.

Still another object to be achieved by the present invention is provide a gas separation device having a gas separation membrane module having a gas separation membrane which has high gas separation selectivity and is suppressed in decrease of gas separation selectivity after exposure to an impurity gas.

As the result of intensive examination conducted by the present inventors, it has been found that a gas separation membrane which has high gas separation selectivity and is suppressed in decrease of gas separation selectivity after exposure to an impurity gas by laminating a first separation layer having high gas separation selectivity and a second separation membrane having a maximum value of an F/C ratio of a predetermined value or greater, the F/C ratio being the ratio of the number of fluorine atoms to the number of carbon atoms, can be obtained.

In JP1996-052332A (JP-H08-052332A), JP1995-308555A (JP-H07-308555A), JP1993-329343A (JP-H05-329343A), JP1985-118217A (JP-S60-118217A), JP2016-503448A, and JP2013-017988A, it is not described that a film including a fluorine atom is used as a separation layer and is laminated with another separation layer to form two or more separation layers.

The present invention which is specific means for solving the above-described problems and preferred aspects of the present invention are as follows.

[1] A gas separation membrane comprising: a first separation layer; and a second separation layer, in which the first separation layer has an Si/C ratio of 0.3 or less, the Si/C ratio being a ratio of the number of silicon atoms to the number of carbon atoms at an interface of the first separation layer on a second separation layer side, and the second separation layer has a maximum value of an F/C ratio of 0.20 or more, the F/C ratio being a ratio of the number of fluorine atoms to the number of carbon atoms, and has an Si/C ratio of 0.3 or less in a portion where the F/C ratio is maximum.

[2] In the gas separation membrane according to [1], it is preferable that the second separation layer and the first separation layer are disposed in this order from a side to which a gas is supplied.

[3] In the gas separation membrane according to [1] or [2], it is preferable that the second separation layer has a thickness of 20 to 200 nm.

[4] In the gas separation membrane according to any one of [1] to [3], it is preferable that the second separation layer has a free volume diameter of 0.6 nm or more.

[5] In the gas separation membrane according to any one of [1] to [4], it is preferable that the second separation layer is insoluble in an organic solvent consisting of toluene and heptane at a compositional ratio of 1:1 by mass ratio.

[6] In the gas separation membrane according to any one of [1] to [5], it is preferable that the second separation layer includes a resin, and the second separation layer includes at least one of a fluoro(meth)acrylate polymer or a fluoroolefin polymer as the resin of the second separation layer.

[7] In the gas separation membrane according to any one of [1] to [6], it is preferable that the second separation layer includes a resin, and the resin of the second separation layer includes at least one of an acrylic ester bond, a methacrylic ester bond, a urethane bond, or an ether bond.

[8] In the gas separation membrane according to any one of [1] to [7], it is preferable that the second separation layer includes a fluorine-containing surfactant.

[9] In the gas separation membrane according to any one of [1] to [8], it is preferable that the first separation layer includes a resin, and the resin of the first separation layer is cellulose or polyimide.

[10] In the gas separation membrane according to [9], it is preferable that the resin of the first separation layer is a polyimide having a structure derived from 4,4'-(hexafluoroisopropylidene)diphthalic acid anhydride.

[11] In the gas separation membrane according to [9] or [10], it is preferable that the resin of the first separation layer is a polyimide including a sulfonamide group.

[12] It is preferable that the gas separation membrane according to any one of [1] to [11] further comprises a protective layer, and the protective layer includes a compound having a siloxane bond.

[13] In the gas separation membrane according to [12], it is preferable that the protective layer is in direct contact with the second separation layer, and the protective layer and the second separation layer are disposed in this order from a side to which a gas is supplied.

[14] A gas separation membrane module comprising: the gas separation membrane according to any one of [1] to [13].

[15] A gas separation device comprising: the gas separation membrane module according to [14].

According to the present invention, it is possible to provide a gas separation membrane which has high gas separation selectivity and is suppressed in decrease of gas separation selectivity after exposure to an impurity gas.

BRIEF DESCRIPTION OF THE DRAWINGS

FIG. 2 is a schematic view showing another example of the gas separation membrane according to the present invention.

FIG. 3 is a schematic view showing an example of a sample used in a case where decrease of the gas separation selectivity of the gas separation membrane after exposure to an impurity gas is evaluated.

DESCRIPTION OF THE PREFERRED EMBODIMENTS

Figure 1:
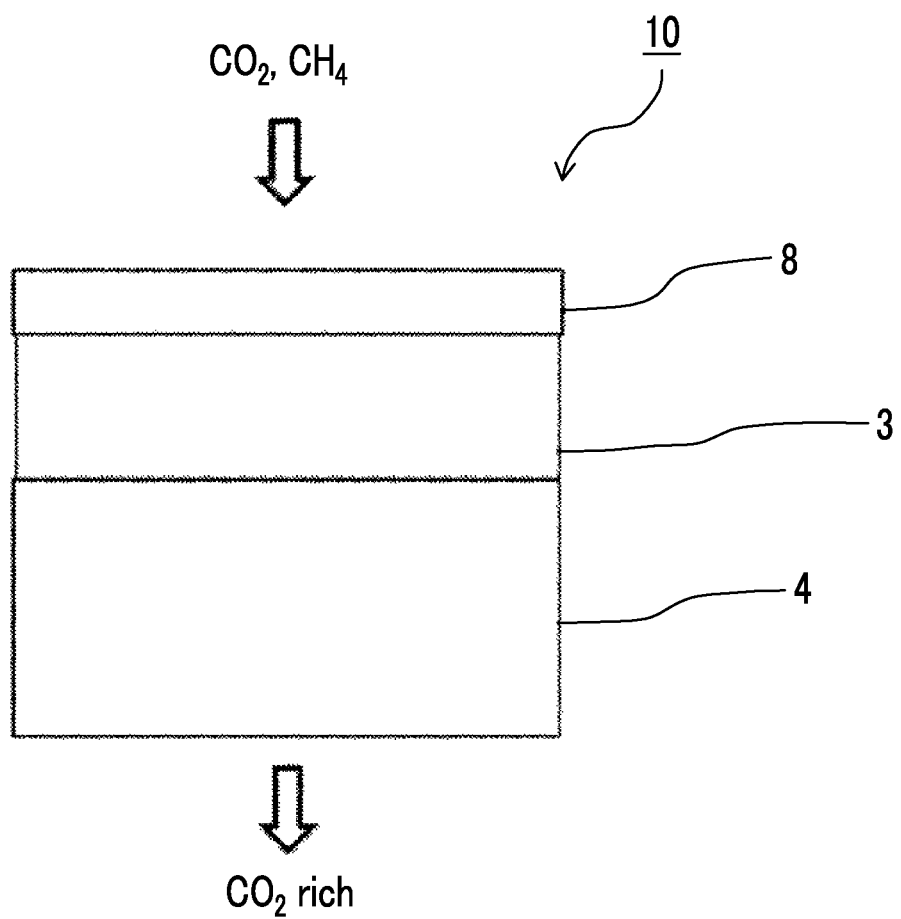
FIG. 1 is a schematic view showing an example of a gas separation membrane according to the present invention.

Hereinafter, the present invention will be described in detail. The description of the constitutional requirements described below is made on the basis of representative embodiments of the present invention, but it should be construed that the present invention is not limited to those embodiments. In the present specification, numerical value ranges expressed by the term "to" mean that the numerical values described before and after "to" are included as a lower limit and an upper limit, respectively.

In the present specification, when a plurality of substituents or linking groups (hereinafter, referred to as substituents or the like) shown by specific symbols are present or a plurality of substituents are defined simultaneously or alternatively, this means that the respective substituents may be the same as or different from each other. In addition, even in a case where not specifically stated, when a plurality of substituents or the like are adjacent to each other, the substituents may be condensed or linked to each other and form a ring.

In regard to compounds (including resins) described in the present specification, the description includes salts thereof and ions thereof in addition to the compounds. Further, the description includes derivatives formed by changing a predetermined part within the range in which desired effects are exhibited.

A substituent (the same applies to a linking group) in the present specification may have an optional substituent of the group within the range in which desired effects are exhibited. The same applies to a compound in which substitution or non-substitution is not specified.

The term "(meth)acryl" means both acryl and methacryl. The term "(meth)acrylate" means both acrylate and methacrylate.

[Gas Separation Membrane]

A gas separation membrane according to an embodiment of the present invention includes a first separation layer and a second separation layer, the first separation layer has an Si/C ratio of 0.3 or less, the Si/C ratio being a ratio of the number of silicon atoms to the number of carbon atoms at an interface of the first separation layer on a second separation layer side, and the second separation layer has a maximum value of an F/C ratio of 0.20 or more, the F/C ratio being a ratio of the number of fluorine atoms to the number of carbon atoms, and has an Si/C ratio of 0.3 or less in a portion where the F/C ratio is maximum.

By adopting such a configuration, it is possible to provide a gas separation membrane which has high gas separation selectivity and is suppressed in decrease of gas separation selectivity after exposure to an impurity gas.

The impurity gas is not particularly limited, but representative examples are BTX (benzene, toluene, xylene) and higher order hydrocarbon gases such as propane, butane, and hexane. Among these, it is preferable to use one that suppresses a decrease in gas separation selectivity after exposure to BTX (particularly toluene).

The separation layer having an Si/C ratio of 0.3 or less, the Si/C ratio being a ratio of the number of silicon atoms to the number of carbon atoms, has high gas separation selectivity. As the separation layer having an Si/C ratio of 0.3 or less, the Si/C ratio being a ratio of the number of silicon atoms to the number of carbon atoms, a separation layer including polyimide or a separation layer including cellulose is exemplified. In the separation layer having a low Si/C ratio, the Si/C ratio being a ratio of the number of silicon atoms to the number of carbon atoms, a decrease in gas separation selectivity after exposure to an impurity gas hardly occurs.

By providing the first separation layer having a low Si/C ratio and the second separation membrane having a low Si/C ratio and a maximum value of an F/C ratio of a predetermined value or greater, the F/C ratio being a ratio of the number of fluorine atoms to the number of carbon atoms, plasticization of the separation layer having high gas separation selectivity is suppressed, while maintaining the gas separation selectivity of a separation layer having high gas separation selectivity, and it is predicted that a decrease in gas separation selectivity after exposure to an impurity gas can be suppressed.

Further, in a preferable embodiment of the gas separation membrane according to the embodiment of the present invention, it is preferable that the rub resistance (film hardness) of the gas separation membrane is high.

Further, in a preferable embodiment of the gas separation membrane of the present invention, it is preferable that the gas permeability ($CO_2$ permeability) of the gas separation membrane is also high.

Further, in a preferable embodiment of the gas separation membrane of the present invention, it is preferable that the higher order hydrocarbon gas separation selectivity after the lapse of time is also high.

In the present specification, the separation layer indicates a layer having a separation selectivity. A layer having a separation selectivity indicates a layer in which a ratio ($P_{CO2}/P_{CH4}$) of a permeability coefficient ($P_{CO2}$) of carbon dioxide to a permeability coefficient ($P_{CH4}$) of methane, in a case where a membrane having a thickness of 0.05 to 30 μm is formed and pure gas of carbon dioxide ($CO_2$) and methane ($CH_4$) is supplied to the obtained membrane at a temperature of 40° C. by setting the total pressure of the gas supply side to 0.5 MPa, is 1.5 or greater.

Hereinafter, preferable embodiments of the gas separation membrane of the present invention will be described.

<Configuration>

It is preferable that the gas separation membrane according to the embodiment of the present invention is a thin layer composite membrane (also referred to as a gas separation composite membrane) or an asymmetric membrane or is formed of hollow fibers. Among these, a thin layer composite membrane is more preferable.

Hereinafter, a case where the gas separation membrane is a thin layer composite membrane will be described as a typical example, but the gas separation membrane according to the embodiment of the present invention is not limited to this thin layer composite membrane.

A preferable configuration of the gas separation membrane according to the embodiment of the present invention will be described with reference to the accompanying drawings. An example of a gas separation membrane 10 according to an embodiment of the present invention illustrated in FIG. 1 is a thin layer composite membrane and the gas separation membrane 10 includes a support 4, a first separation layer 3, and a second separation layer 8 in this order.

Another example of the gas separation membrane 10 according to the embodiment of the present invention illustrated in FIG. 2 is a gas separation membrane 10 including a support 4, a first separation layer 3, a second separation layer 8, and a protective layer 9 in this order.

The expression "on the support" in the present specification means that another layer may be interposed between the support and a layer having separation selectivity. Further, in regard to the expressions related to up and down, the direction in which a gas to be separated is supplied to is set as "up" and the direction in which the separated gas is discharged is set as "down" as illustrated in FIG. 1 unless otherwise specified.

In the gas separation membrane according to the embodiment of the present invention, as shown in FIGS. 1 and 2, it is preferable that the second separation layer is disposed in the order of the second separation layer and the first separation layer from a side to which a gas is supplied from the viewpoint that the impurity gas in the gas supplied in the second separation layer is selectively separated and is allowed to permeate, plasticization of the first separation layer due to the impurity gas is easily suppressed, and a decrease in gas separation selectivity after exposure to the impurity gas is easily suppressed.

In the gas separation membrane according to the embodiment of the present invention, as shown in FIG. 2, it is preferable that the protective layer 9 is in direct contact with the separation layer and the protective layer is disposed in the order of the protective layer and the second separation layer from the side to which the gas is supplied.

<Support>

It is preferable that the gas separation membrane according to the embodiment of the present invention further has a support on a side of the first separation layer opposite to the protective layer (a side opposite to the side in contact with the protective layer) and more preferable that the first separation layer is formed on the support. From the viewpoint of ensuring the gas permeability sufficiently, it is preferable that the support is thin and is formed of a porous material.

The gas separation membrane according to the embodiment of the present invention may be obtained by forming or disposing the first separation layer 3 on or in the surface of the porous support or may be a thin layer composite membrane conveniently obtained by forming the separation layer on the surface thereof. In a case where the first separation layer 3 is formed on the surface of the porous support, a gas separation membrane with an advantage of having high gas separation selectivity, high gas permeability, and mechanical strength at the same time can be obtained.

In a case where the gas separation membrane according to the embodiment of the present invention is a thin layer composite membrane, it is preferable that the thin layer composite membrane is formed by coating the surface of the porous support with a coating solution (dope) that forms the first separation layer 3 (which includes a form made by a coating material being caused to adhere to a surface through immersion in the present specification). A resin layer may be formed on the porous support and the first selective layer may be formed on the resin layer. Specifically, it is preferable that the support has a porous layer on the first separation layer 3 side and more preferable that the support is a laminate of non-woven fabric and a porous layer disposed on the first separation layer 3 side.

The material of the porous layer which is preferably applied to the support is not particularly limited and the material is preferably an organic or inorganic material as long as the material satisfies the purpose of providing high mechanical strength and high gas permeability. A porous membrane of an organic polymer is preferable, and the thickness of the porous layer is preferably 1 to 3,000 μm, more preferably of 5 to 500 μm, and still more preferably of 5 to 150 μm. In regard to the pore structure of the porous layer, the average pore diameter thereof is typically 10 μm or less, preferably 0.5 μm or less, and more preferably 0.2 μm or less. The porosity thereof is preferably 20% to 90% and more preferably 30% to 80%. Further, the molecular weight cut-off of the porous layer is preferably 100,000 or less. Moreover, the gas permeability is preferably $3 \times 10^{-5}$ $cm^3$ (STP; STP is an abbreviation standing for standard temperature and pressure)/$cm^2 \cdot cm \cdot sec \cdot cmHg$ (30 GPU: GPU is an abbreviation standing for gas permeation unit) or greater in terms of the permeation rate of carbon dioxide.

Examples of the material of the porous layer include conventionally known polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, polyaramid, and polyethylene terephthalate. As the shape of the porous layer, any of a flat shape, a spiral shape, a tubular shape, and a hollow fiber shape can be employed.

In the thin layer composite membrane, it is preferable that woven fabric, non-woven fabric, or a net used to provide mechanical strength is provided in the lower portion of the porous layer disposed on the side of the first separation layer 3. In terms of film forming properties and the cost, non-woven fabric is suitably used. As the non-woven fabric, fibers formed of polyester, polypropylene, polyacrylonitrile, polyethylene, and polyamide may be used alone or in combination of plural kinds thereof. The non-woven fabric can be produced by performing papermaking using main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<First Separation Layer>

The gas separation membrane according to the embodiment of the present invention includes the first separation layer, the first separation layer has an Si/C ratio of 0.3 or less, and the Si/C ratio is a ratio of the number of silicon atoms to the number of carbon atoms at the interface of the first separation layer on the second separation layer side (the interface on a side in contact with the second separation layer).

(Thickness)

It is preferable that the thickness of the first separation layer is as thin as possible under a condition that high gas permeability is imparted while maintaining high mechanical strength and gas separation selectivity.

From the viewpoint of enhancing gas permeability, it is preferable that the first separation layer is a thin layer. The thickness of the first separation layer is preferably 3 or less, more preferably 1 μm or less, particularly preferably 200 nm or less, and particularly preferably 100 nm or less.

The thickness of the first separation layer is typically 10 nm or more and from the viewpoint of practical use and easiness of film production, the thickness is preferably 30 nm or more and more preferably 50 nm or more.

(Si/C Ratio)

The Si/C ratio of the first separation layer, the Si/C ratio being a ratio of the number of silicon atoms to the number of carbon atoms at the interface of the first separation layer on the second separation layer side, is 0.3 or less, and from the viewpoint of gas separation selectivity, the Si/C ratio is preferably 0.2 or less, more preferably 0.1 or less, and particularly preferably 0.

In the present specification, by using the fact that the atomic content (compositional ratio) of any of atoms constituting each layer is different, specification of the layer and specification of the interface can be performed. In a case of creating a graph in which the horizontal axis is set to the length in the thickness direction of the layer and the vertical axis is set to the atomic content of any of atoms by measuring the composition of the interface between the two layers in contact with each other in the thickness direction by ESCA and etching, a slope of the graph becomes the midpoint of the length of the layer in a certain region in the thickness direction. In regard to the atom focused in a case of carrying out specification of the layer and specification of the interface between the two layers, a fluorine atom, a carbon atom, an oxygen atom, and a nitrogen atom are prioritized. First, specification of the layer and specification of the interface between the two layers are performed by focusing on the atom with high priority. Next, in a case where there is no slope in the graph (the atomic contents of the focused atom between the two layers are about the same) and the specification cannot be performed even when focusing on the atom with high priority, an operation of performing specification of the layer and specification of the interface between the two layers is performed by focusing on the atom with the next high priority. This operation is repeatedly performed until the specification of the layer and the specification of the interface between the two layers can be performed.

(Resin of First Separation Layer)

In the gas separation membrane according to the embodiment of the present invention, it is preferable that the first separation layer includes a resin.

The resin of the first separation layer includes the followings, but is not limited thereto. Specifically, polyimide, polyamides, celluloses, polyethylene glycols, and polybenzoxazoles are preferable.

In the gas separation membrane according to the embodiment of the present invention, it is preferable that the resin of the first separation layer is cellulose or polyimide. In the gas separation membrane according to the embodiment of the present invention, it is preferable that the resin of the first separation layer is polyimide.

The polyimide is preferably a polyimide having a reactive group. In the gas separation membrane according to the embodiment of the present invention, it is preferable that the resin of the first separation layer is a polyimide including a sulfonamide group.

In the following description, a case where the resin of the first separation layer is a polyimide having a reactive group will be described as a representative example.

The polyimide having a reactive group that can be used in the present invention will be described in detail.

In the present invention, in regard to the polyimide having a reactive group, a polymer having a reactive group preferably includes a polyimide unit, and a repeating unit having a reactive group at the side chain (preferably having a nucleophilic reactive group, more preferably having a carboxyl group, an amino group, a sulfonamide group or a hydroxyl group).

More specifically, the polymer having a reactive group is preferably a polyimide disclosed in paragraphs <0040> to <0068> of JP2015-160201A or a polyimide having at least a repeating unit represented by Formula (I).

In the gas separation membrane according to the embodiment of the present invention, the resin of the first separation layer is more preferably a polyimide having at least the repeating unit represented by Formula (I) and particularly preferably a polyimide including a sulfonamide group.

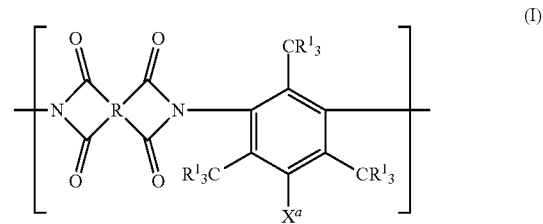

In Formula (I), $R^I$ represents a hydrogen atom, an alkyl group, or a halogen atom. $X^a$ represents a polar group selected from a sulfonamide group, an alkoxysulfonyl group, a carboxyl group, a hydroxyl group, an acyloxy group and a halogen atom.

R represents a group having a structure represented by any one of Formulae (I-1) to (I-28). Here, $X^1$ to $X^3$ each represent a single bond or a divalent linking group, L represents —CH=CH— or —CH$_2$—, $R^1$ and $R^2$ each represent a hydrogen atom or a substituent, and * represents a bonding site with a carbonyl group in Formula (I).

R preferably represents a group represented by Formula (I-1), (I-2), or (I-4), more preferably represents a group represented by Formula (I-1) or (I-4), and particularly preferably represents a group represented by Formula (I-1).

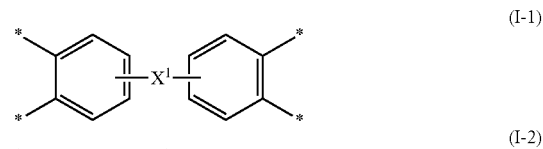

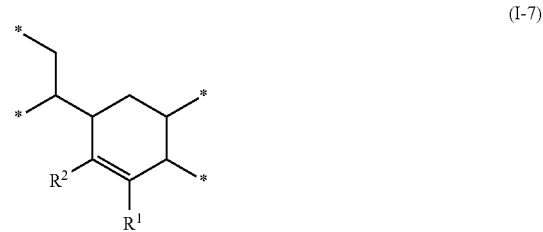

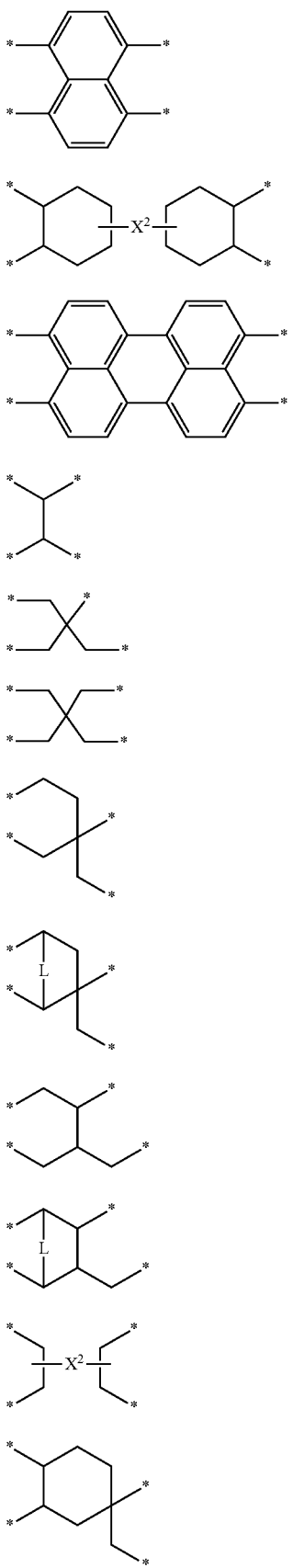
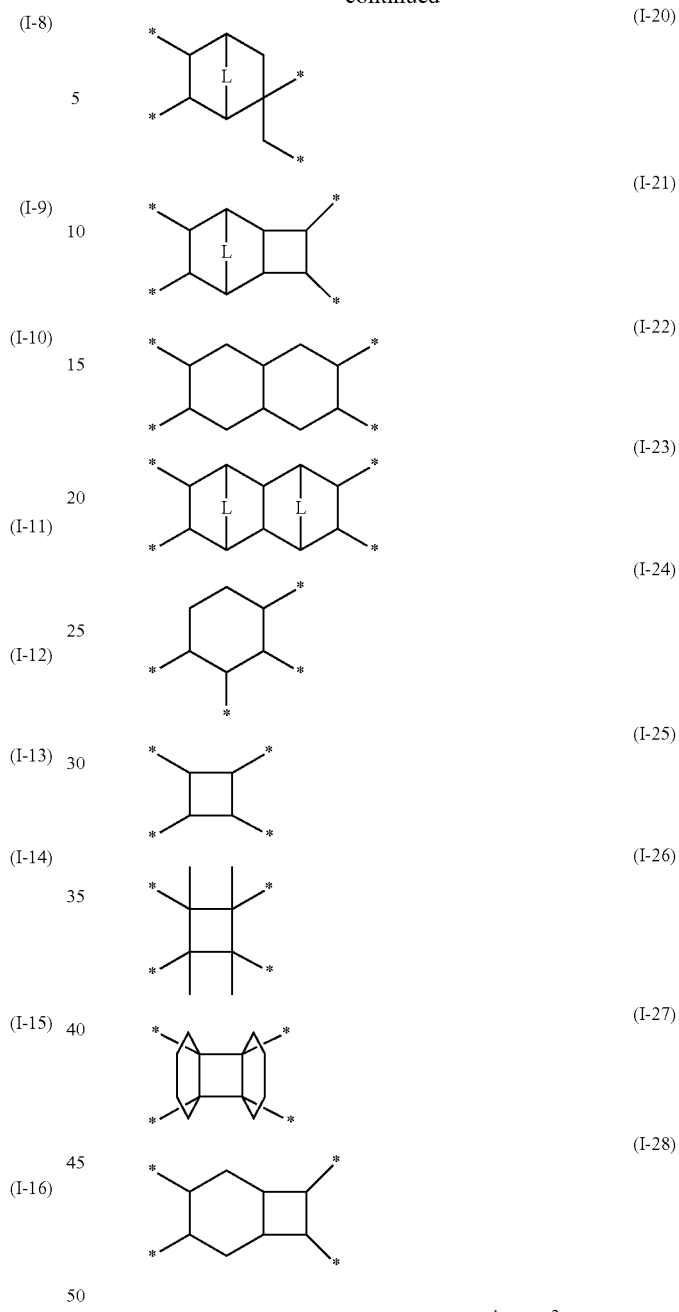

In Formulae (I-1), (I-9), and (I-18), $X^1$ to $X^3$ each represent a single bond or a divalent linking group. As the divalent linking group, —C($R^x$)$_2$— ($R^x$ represents a hydrogen atom or a substituent; in a case where $R^x$ represents a substituent, $R^x$'s may be linked and form a ring), —O—, —SO$_2$—, —C(=O)—, —S—, —NR$^Y$— ($R^Y$ represents a hydrogen atom, an alkyl group (preferably a methyl group or an ethyl group), or an aryl group (preferably a phenyl group)), —C$_6$H$_4$-(phenylene group), or a combination thereof is preferable, and —C($R^x$)$_2$— is more preferable. In a case where $R^x$ represents a substituent, specific example of the substituent include groups selected from the substituent group Z described in paragraphs <0055> to <0060> of JP2015-160201A, and among these, an alkyl group (the preferable range thereof is the same as the alkyl group shown in the substituent group Z described in paragraphs <0055> to <0060> of JP2015-160201A) is preferable, an alkyl group having a halogen atom as a substituent is more preferable, and trifluoromethyl is particularly preferable. Formula (I-18) means that $X^3$ is linked to one of two carbon atoms shown on the left side of $X^3$ (the left side of the page, hereinafter, the same is applied to left and right), and one of two carbon atoms shown on the right side of $X^3$.

In Formulae (I-4), (I-15), (I-17), (I-20), (I-21), and (I-23), L represents —CH=CH— or —CH$_2$—. A plurality of L's in Formula (I-23) may be the same as or different from each other.

In Formula (I-7), $R^1$ and $R^2$ each represent a hydrogen atom or a substituent. As the substituent, a group selected from the substituent group Z described in paragraphs <0055> to <0060> of JP2015-160201A may be exemplified. $R^1$ and $R^2$ may be linked to each other and form a ring.

$R^1$ and $R^2$ preferably represent a hydrogen atom or an alkyl group, more preferably represent a hydrogen atom, a methyl group, or an ethyl group, and still more preferably represent a hydrogen atom.

A substituent may be added to the carbon atom shown in Formulae (I-1) to (I-28). Specific examples of the substituent include groups selected from the substituent group Z described in paragraphs <0055> to <0060> of JP2015-160201A, and among these, an alkyl group or an aryl group is preferable.

In Formula (I), $R^I$ represents a hydrogen atom, an alkyl group, or a halogen atom. The alkyl group may be linear or branched. The number of carbon atoms of the alkyl group which can be taken as $R^I$ is preferably 1 to 5, more preferably 1 to 3, and still more preferably 1 or 2. The alkyl group which can be taken as $R^I$ may have a hetero atom (preferably an oxygen atom or a sulfur atom) in its chain. As a suitable specific example of $R^I$, a methyl group or an ethyl group is exemplified, and a methyl group is more preferable.

Examples of the halogen atom which can be taken as $R^I$ include a bromine atom, a chlorine atom, an iodine atom, and a fluorine atom, and a bromine atom is more preferable.

$R^I$ more preferably represents a hydrogen atom, a methyl group, or a bromine atom, more preferably represents a hydrogen atom or a methyl group, and still more preferably represents a hydrogen atom.

In Formula (I), $X^a$ represents a polar group selected from a sulfonamide group, an alkoxysulfonyl group, a carboxyl group, a hydroxyl group, an acyloxy group, and a halogen atom.

The sulfonamide group which can be taken as $X^a$ may be unsubstituted or may have a substituent. Among these, the sulfonamide group which can be taken as $X^a$ is preferably unsubstituted, monoalkyl-substituted, or dialkyl-substituted, more preferably unsubstituted or monoalkyl-substituted, and particularly preferably unsubstituted. That is, in a case where the sulfonamide group which can be taken as $X^a$ has a substituent, the substituent is preferably an alkyl group. The alkyl group may be linear or branched and the number of carbon atoms of the alkyl group is preferably 1 to 10, more preferably 1 to 5, and still more preferably 1 to 3. In addition, the alkyl group preferably has a halogen atom as a substituent, and more preferably has a fluorine atom as a substituent. Preferable specific examples of the alkyl group having a sulfonamide group include a methyl group, an ethyl group, an n-propyl group, —CH$_2$CF$_2$CF$_2$CF$_3$, —CH$_2$CF$_2$CF$_3$, and —CH$_2$CF$_3$.

Among these, in a case where the sulfonamide group is monoalkyl-substituted, the alkyl group is a methyl group, but is preferably an alkyl group having a fluorine atom as a substituent and more preferably a methyl group, —CH$_2$CF$_2$CF$_3$, or —CH$_2$CF$_3$.

In addition, in a case where the sulfonamide group is dialkyl-substituted, the alkyl group is preferably a methyl group.

The sulfonamide group which can be taken as $X^a$ also preferably has a cycloalkyl group as a substituent. The cycloalkyl group preferably has 3 to 15 carbon atoms and more preferably has 6 to 10 carbon atoms. Among these, the cycloalkyl group is preferably an adamantyl group. In a case where the sulfonamide group which can be taken as $X^a$ has a cycloalkyl group as a substituent, the number of cycloalkyl groups of the sulfonamide group is preferably one. That is, the sulfonamide group is preferably a monosubstituted product.

The sulfonamide group which can be taken as $X^a$ is more preferably unsubstituted.

The number of carbon atoms of the alkoxysulfonyl group which can be taken as $X^a$ is preferably 1 to 5 and more preferably 1 to 3. The alkoxy group in the alkoxysulfonyl group which can be taken as $X^a$ is preferably a methoxy group or an ethoxy group and is more preferably a methoxy group.

The number of carbon atoms of the acyloxy group which can be taken as $X^a$ is preferably 2 to 5 and more preferably 2 or 3, and among these, an acetoxy group is particularly preferable.

Examples of the halogen atom which can be taken as $X^a$ include a bromine atom, a chlorine atom, an iodine atom, and a fluorine atom, and a bromine atom is preferable.

As for $X^a$, a sulfonamide group, an alkoxysulfonyl group, a carboxyl group, a hydroxyl group, and an acyloxy group are preferable, a sulfonamide group, an alkoxysulfonyl group, a carboxyl group, and a hydroxyl group are more preferably, a sulfonamide group, a carboxyl group, and a hydroxyl group are particularly preferable, and a sulfonamide group is more particularly preferable.

By forming the first separation layer using a polyimide having a repeating unit represented by Formula (I), all of the gas permeability, the gas separation selectivity, and the plasticization resistance of the gas separation membrane to be obtained can be further improved. Although the reason is not clear, it is assumed that since the repeating unit represented by Formula (I) has three $CR^I_3$ groups in the diamine component, the flatness and the packing properties of the polyimide are appropriately suppressed and the free volume fraction is increased so that the gas permeability is improved. In addition, it is also assumed that since the repeating unit represented by Formula (I) has a specific polar group as $X^a$, the polyimide is moderately densified, its motility is lowered, and thereby the permeability of a molecule with a large dynamic molecular diameter can be effectively suppressed so that the gas separation selectivity is further improved.

The polyimide having a repeating unit represented by Formula (I) has a diamine component having three $CR^I_3$ groups. Since the polyimide having a large number of alkyl groups as described above has low polarity, the affinity with impurities of low polarity such as toluene is increased and the plasticization resistance tends to deteriorate. However, the polyimide having a repeating unit represented by Formula (I) has a specific polar group $X^a$ at a specific site in the diamine component in addition to three $CR^I_3$ groups. Thus, it is assumed that a gas separation membrane which exhibits high gas permeability and gas separation selectivity, is suppressed in affinity with impurities due to the polar group, and has excellent plasticization resistance can be prepared.

The polyimide may be crosslinked by a crosslinking agent.

For example, in a case where the polar group $X^a$ has an unsubstituted or monosubstituted sulfonamide group, for the purpose of forming a crosslinked structure through the NH group of the sulfonamide group, it is possible to use a metal alkoxide such as tetraisopropyl orthotitanate as a crosslinking agent. In addition, in a case where $CR^I_3$ has a halogen atom, for the purpose of conducting a nucleophilic addition reaction, it is possible to use a crosslinking agent such as dimethylaminopropyl triethoxysilane or tetramethyl ethylenediamine.

Further, in a case where the polyimide used in the present invention has a repeating unit represented by Formula (II-a) or (II-b), which will be described later, the polyimide may be crosslinked by a crosslinking agent having a functional group and a reactive group contained in these repeating units.

The repeating unit represented by Formula (I) is preferably a repeating unit represented by Formula (I-a).

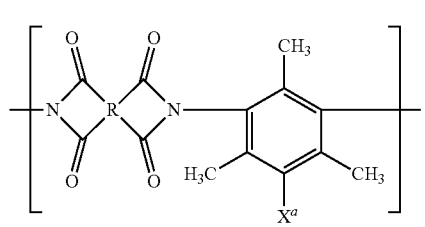

(I-a)

In Formula (I-a), R and $X^a$ each have the same meaning as R and $X^a$ in Formula (I), and the preferable form thereof is the same.

The repeating unit represented by Formula (I-a) is preferably a repeating unit represented by Formula (I-b).

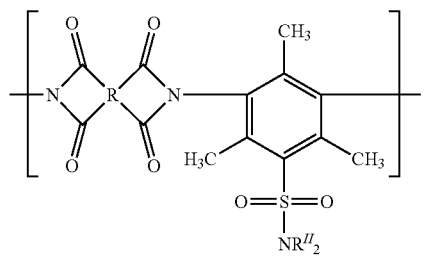

(I-b)

In Formula (I-b), R has the same meaning as R in Formula (I-a), and the preferable form thereof is the same.

$R^{II}$ represents a hydrogen atom or a substituent. It is preferable that at least $R^{II}$ of two $R^{II}$'s represents a hydrogen atom, and it is more preferable that both of two $R^{II}$'s represent a hydrogen atom. In a case where $R^{II}$ represent a substituent, a group selected from the substituent group Z described in paragraphs <0055> to <0060> of JP2015-160201A is preferable and an alkyl group or a cycloalkyl group is more preferable.

The alkyl group which can be taken as $R^{II}$ may be linear or branched and the number of carbon atoms of the alkyl group is preferably 1 to 10, more preferably 1 to 5, and particularly preferably 1 to 3. In addition, the alkyl group preferably has a halogen atom as a substituent and more preferably has a fluorine atom as a substituent. Preferable specific examples in a case where $R^{II}$ represents an alkyl group include a methyl group, an ethyl group, an n-propyl group, —$CH_2CF_2CF_2CF_3$, —$CH_2CF_2CF_3$, and —$CH_2CF_3$.

In a case where one of two $R^{II}$'s represents a hydrogen atom and the other represents an alkyl group, the alkyl group preferably represents a methyl group or an alkyl group having a fluorine atom as a substituent and more preferably represents a methyl group, —$CH_2CF_2CF_2CF_3$, or —$CH_2CF_3$.

In a case where both of two $R^{II}$'s represent an alkyl group, the alkyl group is preferably a methyl group.

The number of carbon atoms of the cycloalkyl group which can be taken as $R^{II}$ is preferably 3 to 15 and more preferably 6 to 10. In a case where $R^{II}$ represents a cycloalkyl group, an adamantyl group is preferable. In a case where one of two $R^{II}$'s represents a cycloalkyl group, the other preferably represents a hydrogen atom.

The repeating unit represented by Formula (I-b) is preferably a repeating unit represented by Formula (I-c).

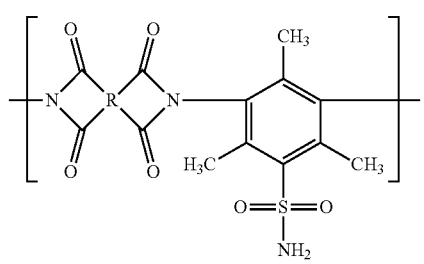

(I-c)

In Formula (I-c), R has the same as R in Formula (I-b), and the preferable form is the same.

The polyimide used in the present invention may have a repeating unit represented by Formula (II-a) or (II-b) in addition to the repeating unit represented by Formula (I).

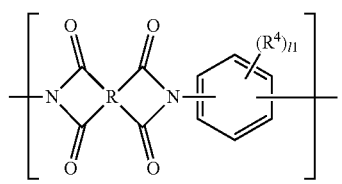

Formula (II-a)

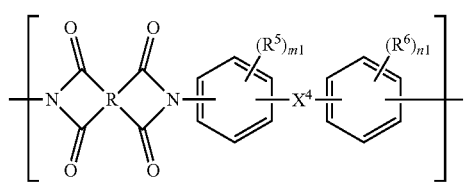

Formula (II-b)

In Formulae (II-a) and (II-b), R has the same meaning as R in Formula (I), and the preferable range thereof is also the same. $R^4$ to $R^6$ each represent a substituent. As the substituent, a group selected from the substituent group Z described in paragraphs <0055> to <0060> of JP2015-160201A may be exemplified.

$R^4$ preferably represents an alkyl group, a carboxyl group, or a halogen atom. l1 indicating the number of $R^4$'s is an integer of 0 to 4, and in a case where $R^4$ represents an alkyl group, l1 is preferably 1 to 4, more preferably 2 to 4, and particularly preferably 3 or 4. In a case where $R^4$ represents a carboxyl group, l1 is preferably 1 to 2 and more preferably 1. In a case where $R^4$ represents an alkyl group, the number of carbon atoms of the alkyl group preferably 1 to 10, more preferably 1 to 5, and particularly preferably 1 to 3. In a case where $R^4$ represents an alkyl group, a methyl group, an ethyl group, or a trifluoromethyl group is more particularly preferable.

In Formula (II-a), in order to incorporate the phenylene group having $R^4$ in the diamine component in the polyimide, two linking sites are preferably located at the meta or para position with respect to each other and more preferably located at the para position with respect to each other.

In the present invention, the structure represented by Formula (I) is not included in the structure represented by Formula (II-a).

It is preferable that $R^5$ and $R^6$ represent an alkyl group or a halogen atom, or groups that are linked to each other and form a ring with $X^4$ together. In addition, it is also preferable that two $R^5$'s are linked and form a ring or two $R^6$'s are linked and form a ring. The structure formed by linking $R^5$ and $R^6$ is not particularly limited but a single bond, —O—, or —S— is preferable. m1 and n1 indicating the number of $R^5$ and $R^6$ are integers of 0 to 4, preferably 1 to 4, more preferably 2 to 4, and particularly preferably 3 or 4. In a case where $R^5$ and $R^6$ each represent an alkyl group, the number of carbon atoms of the alkyl group is preferably 1 to 10, more preferably 1 to 5, and particularly preferably 1 to 3. In a case where $R^5$ and $R^6$ each represent an alkyl group, a methyl group, an ethyl group, or a trifluoromethyl group is more particularly preferable.

$X^4$ has the same meaning as $X^1$ in Formula (I-1), and the preferable range thereof is also the same.

In the polyimide, the ratio of the molar amount of the repeating unit represented by Formula (I) with respect to the total molar amount of the repeating unit represented by Formula (I), the repeating unit represented by Formula (II-a), and the repeating unit represented by Formula (II-b) in the structure is preferably 50% to 100% by mole, more preferably 70% to 100% by mole, particularly preferably 80% to 100% by mole, and more particularly preferably 90% to 100% by mole. A case where the ration of the molar amount of the repeating unit represented by Formula (I) with respect to the total molar amount of the repeating unit represented by Formula (I), the repeating unit represented by Formula (II-a), and the repeating unit represented by Formula (II-b) is 100% by mole means that the polyimide does not have any of the repeating unit represented by Formula (II-a) and the repeating unit represented by Formula (II-b).

The polyimide may be formed of the repeating unit represented by Formula (I) or may have repeating units other than the repeating unit represented by Formula (I).

In a case where the polyimide has repeating units other than the repeating unit represented by Formula (I), the remainder other than the repeating unit represented by Formula (I) is preferably formed of the repeating unit represented by Formula (II-a) or (II-b). Here, the expression "formed of the repeating unit represented by Formula (II-a) or (II-b)" means to include three aspects of an aspect in which the polyimide is formed of the repeating unit represented by Formula (II-a), an aspect in which the polyimide is formed of the repeating unit represented by Formula (II-b), and an aspect in which the polyimide is formed of the repeating unit represented by Formula (II-a) and the repeating unit represented by Formula (II-b).

In the gas separation membrane according to the embodiment of the present invention, it is preferable that the resin of the first separation layer is a polyimide having a structure derived from 4,4'-(hexafluoroisopropylidene)diphthalic acid anhydride (6FDA) from the viewpoint of separation selectivity and gas permeability. That is, it is preferable that a mother nucleus R is a group represented by Formula (I-1), $X^1$ is —C($R^x$)$_2$—, and $R^x$ is trifluoromethyl.

In the present specification, in a case where the expression "may be linked to each other and form a ring", the linkage may be made by a single bond or a double bond and then a cyclic structure may be formed or condensation may be made and then a condensed ring structure may be formed.

The substituent group Z described in paragraphs <0055> to <0060> of JP2015-160201A may be further substituted with one or more substituents selected from the substituent group Z.

In the present invention, in a case where a plurality of substituent groups are present at one structural site, these substituents may be linked to each other and form a ring or may be condensed with some or entirety of the structural site and form an aromatic ring or an unsaturated hetero ring.

In a case where a compound, a substituent, or the like includes an alkyl group, an alkenyl group, or the like, these may be linear or branched, and may be substituted or unsubstituted. In addition, in a case where a compound, a substituent, or the like includes an aryl group, a heterocyclic group, or the like, these may be monocyclic or condensed, and may be substituted or unsubstituted.

In the present specification, unless otherwise stated, those which are simply described as a substituent refer to the substituent group Z described in paragraphs <0055> to <0060> of JP2015-160201A, and only in a case where the name of each group is described (for example, only in a case where "alkyl group" is described), the preferable ranges and/or specific examples of the groups corresponding to the substituent group Z are applied.

The molecular weight of the polyimide which can be used in the present invention is preferably 10,000 to 1000,000, more preferably 15,000 to 500,000, and still more preferably 20,000 to 200,000 as the weight-average molecular weight.

The molecular weight and the dispersity in the present specification are set to values measured using a gel permeation chromatography (GPC) method unless otherwise specified, and the molecular weight is set to a weight-average molecular weight in terms of polystyrene. A gel having an aromatic compound as a repeating unit is preferable as a gel filling a column used for the GPC method and for example, a gel formed of a styrene-divinylbenzene copolymer is exemplified.

It is preferable that two to six columns are connected to each other and used.

Examples of a solvent to be used include an ether-based solvent such as tetrahydrofuran and an amide-based solvent such as N-methylpyrrolidinone.

It is preferable that measurement is performed at a flow rate of the solvent of 0.1 mL/min to 2 mL/min and most preferable that the measurement is performed at a flow rate thereof of 0.5 mL/min to 1.5 mL/min. In a case where the measurement is performed in the above range, a load is not applied to the device and the measurement can be more efficiently performed.

The measurement temperature is preferably 10° C. to 50° C. and more preferably 20° C. to 40° C.

The column and the solvent to be used can be appropriately selected according to the physical properties of a polymer compound which is a target for measurement.

The polyimide having a reactive group that can be used in the present invention can be synthesized by performing condensation and polymerization of a specific bifunctional acid anhydride (tetracarboxylic dianhydride) and a specific diamine. As the method, a technique described in a general book (for example, "The Latest Polyimide~Fundamentals and Applications~" edited by Toshio Imai and Rikio Yokota, NTS Inc., pp. 3 to 49, published by NTS Inc. on Aug. 25, 2010) can be appropriately selected.

In the synthesis of the polyimide that can be used in the present invention, at least one kind of tetracarboxylic dianhydride as one raw material is preferably represented by Formula (IV). It is preferable that all tetracarboxylic dianhydrides used as raw materials are represented by Formula (IV).

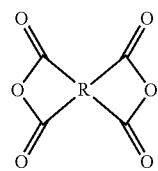

Formula (IV)

In Formula (IV), R has the same meaning as R in Formula (I).

Specific examples of tetracarboxylic dianhydride that can be used in the present invention include the followings.

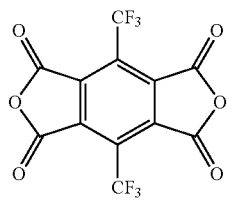
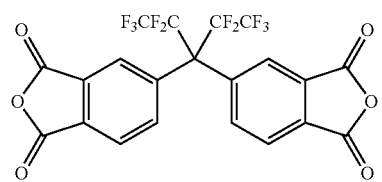
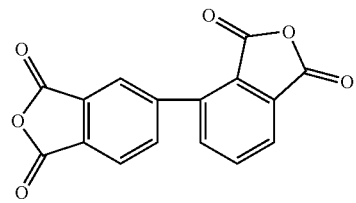

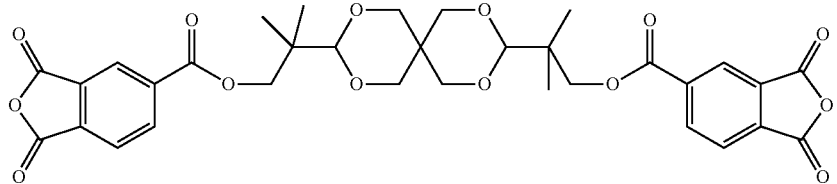

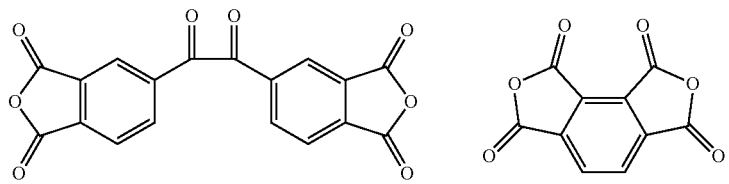

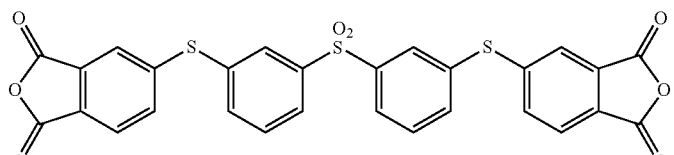

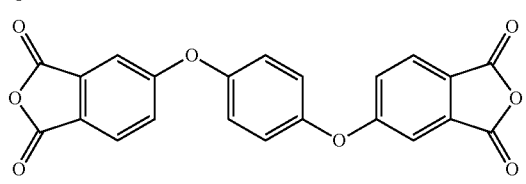
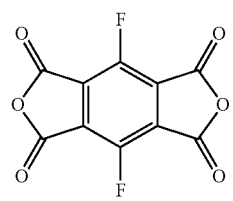

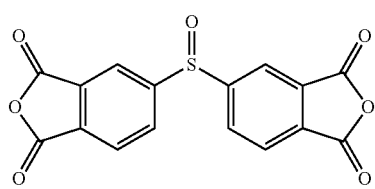
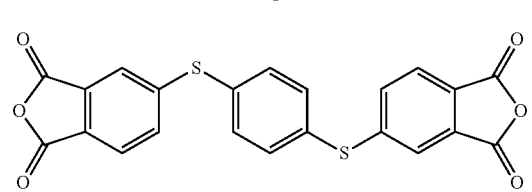

-continued
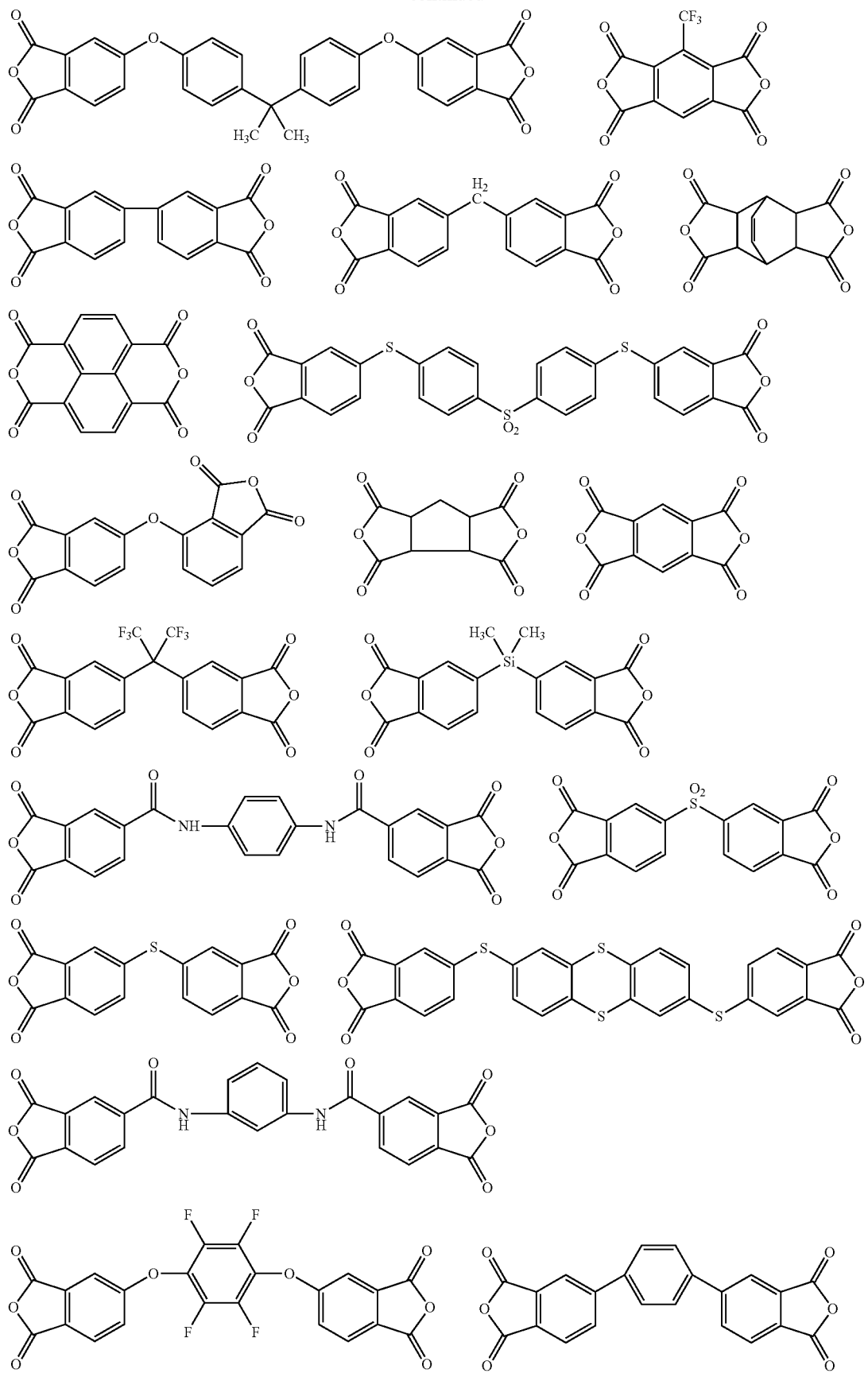

-continued
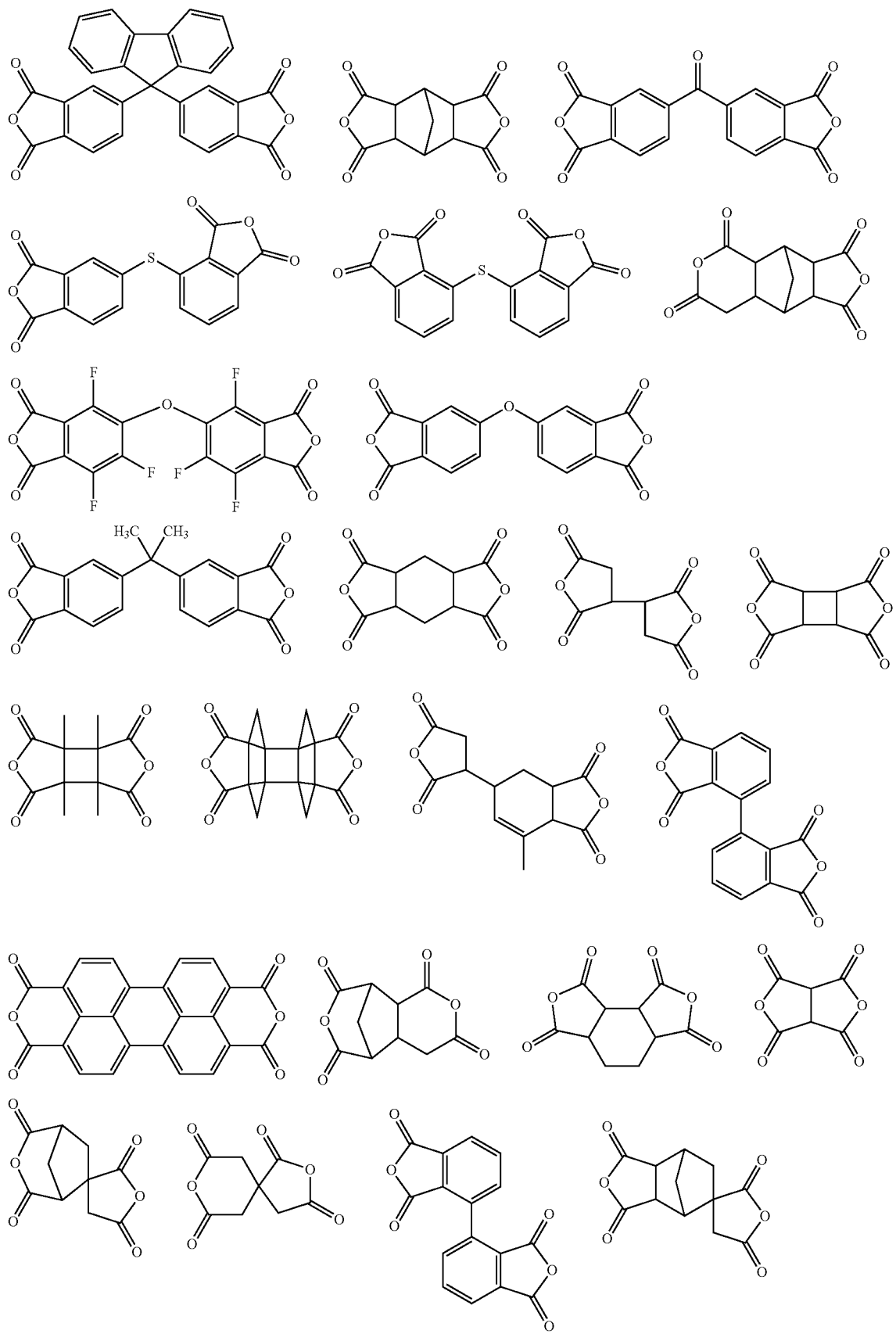

-continued
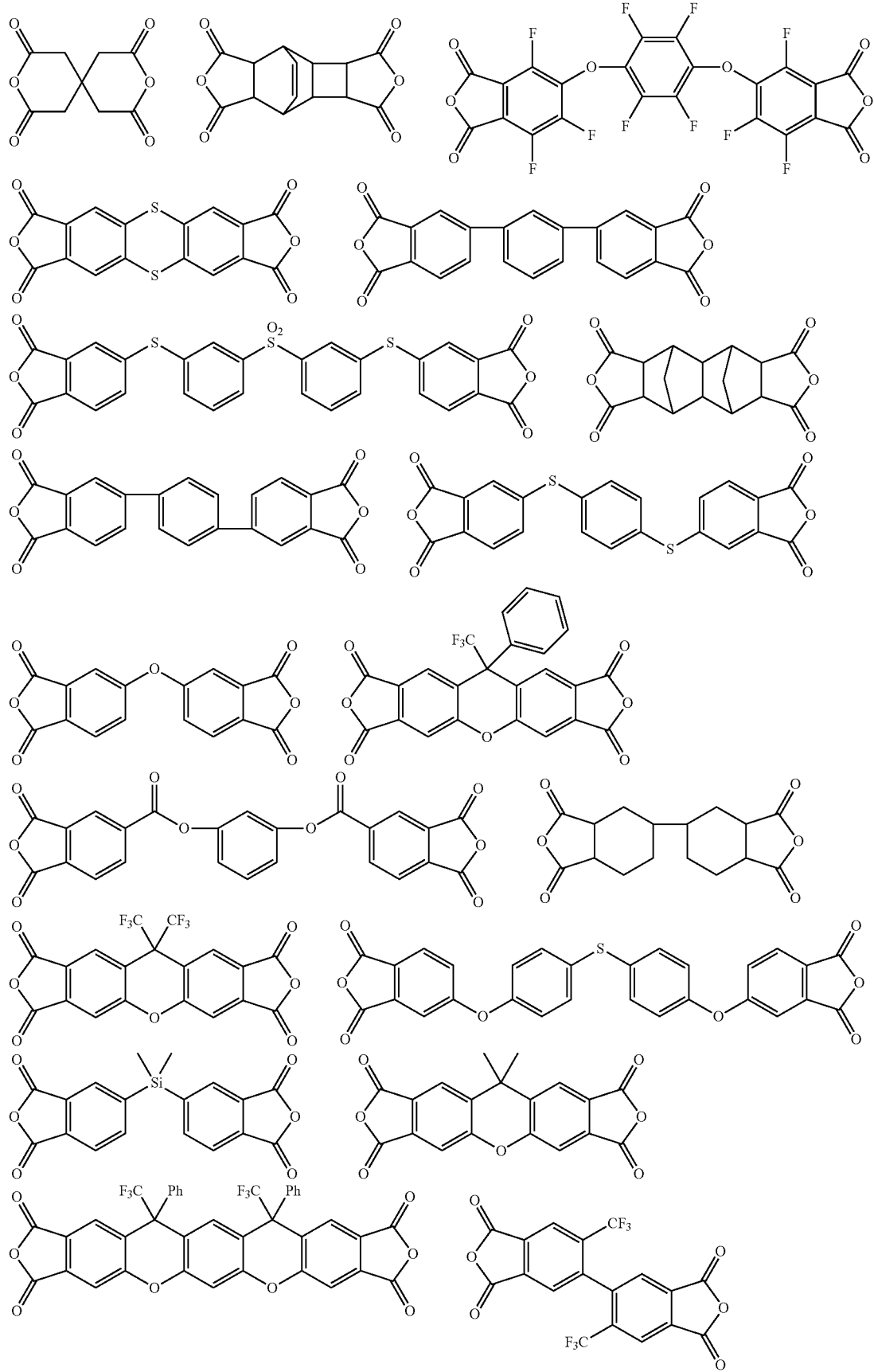

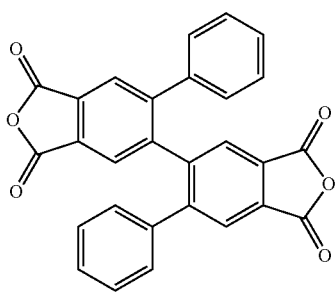

In the synthesis of the polyimide that can be used in the present invention, at least one kind of diamine compound as the other raw material is preferably represented by Formula (V).

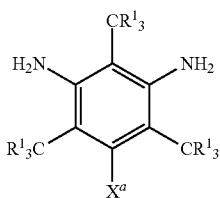

(V)

In Formula (V), $R^I$ and $X^a$ each have the same meaning as $R^I$ and $X^a$ in Formula (I).

Specific examples of the diamine compound represented by Formula (V) include the followings. However, the present invention is not limited to these compounds. In the present specification, Me means methyl and Et means ethyl.

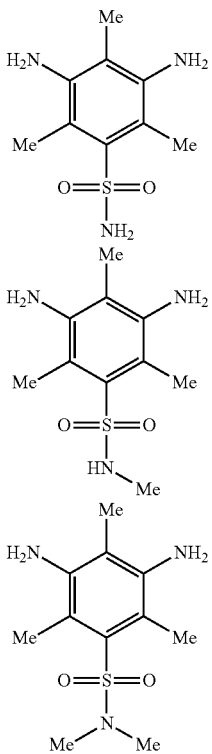
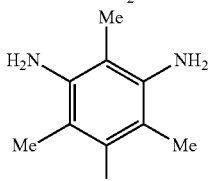
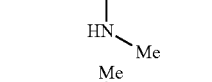
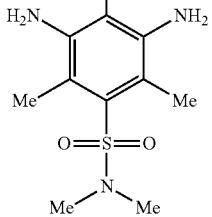

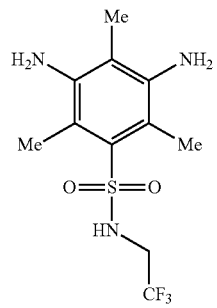
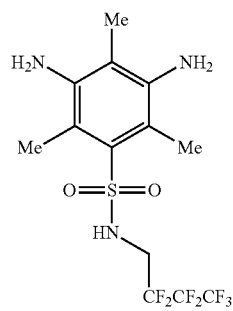
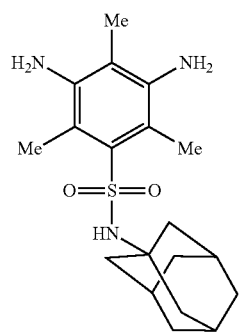
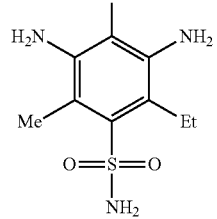

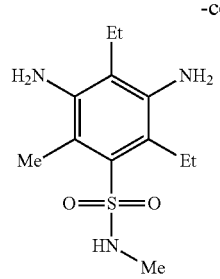
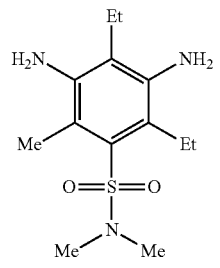
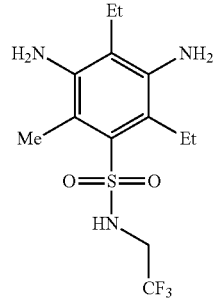
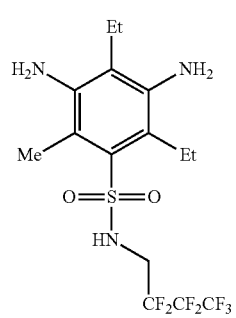
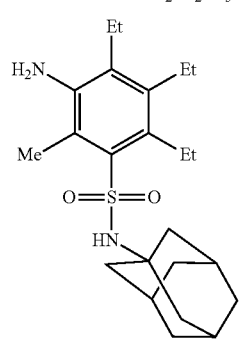
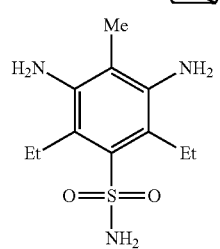
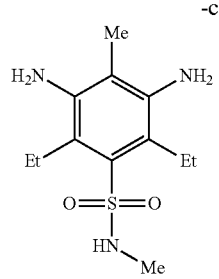
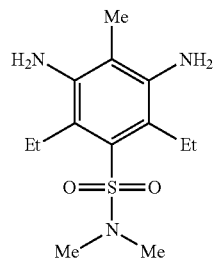
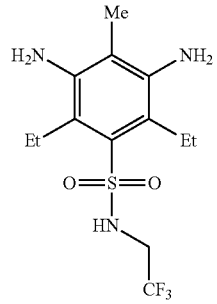
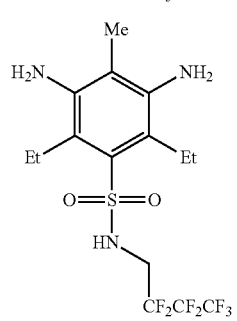
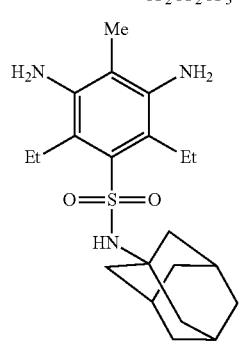
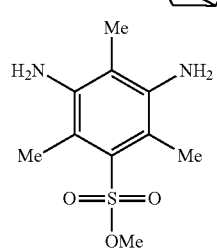

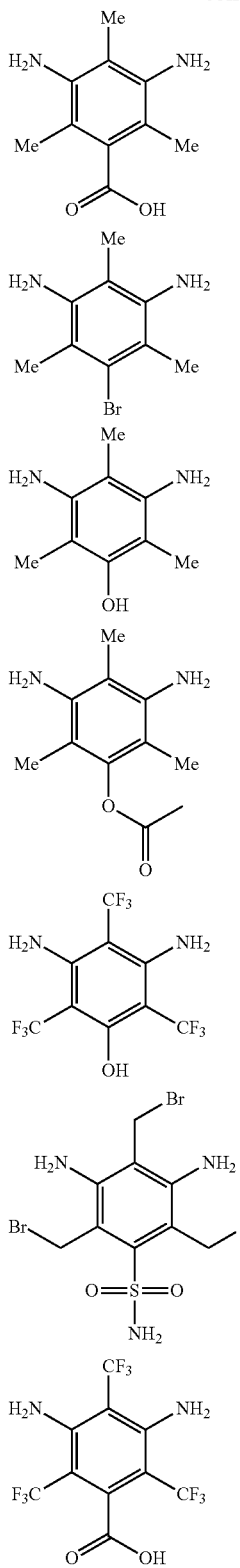

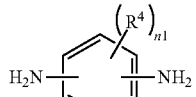

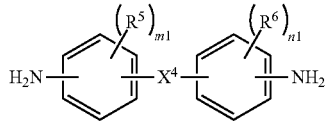

In Formula (VII-a), $R^4$ and 11 each represent the same meaning as $R^4$ and 11 in Formula (II-a). The diamine compound represented by Formula (VII-a) does not include the diamine compound represented by Formula (V).

In Formula (VII-b), $R^5$, $R^6$, $X^4$, m1, and n1 each represent the same meaning as $R^5$, $R^6$, $X^4$, m1, and n1 in Formula (II-b).

As the diamine compound represented by Formula (VII-a) or (VII-b), for example, the compounds shown below can be used.

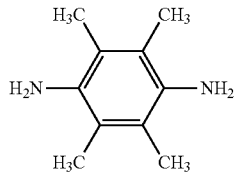

Diamine-1

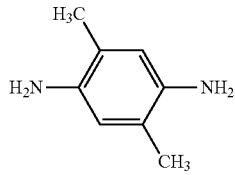

Diamine-2

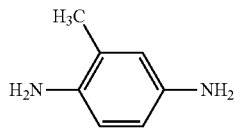

Diamine-3

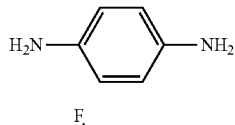

Diamine-4

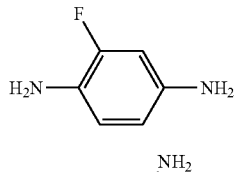

Diamine-5

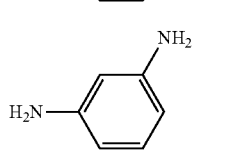

Diamine-6

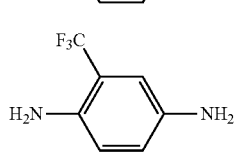

Diamine-7

In addition, in the synthesis of the polyimide that can be used in the present invention, as the diamine compound used as a raw material, in addition to the diamine compound represented by Formula (V), a diamine compound represented by Formula (VII-a) or (VII-b) may be used.

-continued
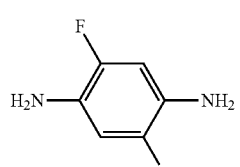
Diamine-8
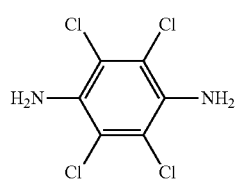
Diamine-9
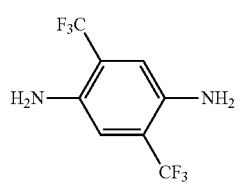
Diamine-10
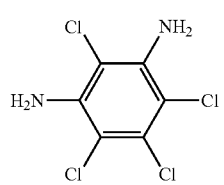
Diamine-11
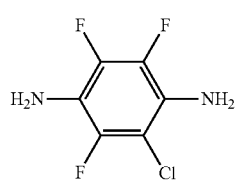
Diamine-12
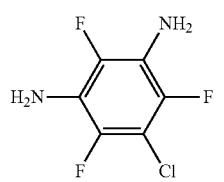
Diamine-13
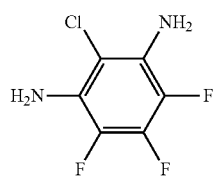
Diamine-14
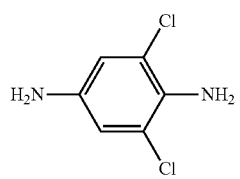
Diamine-15
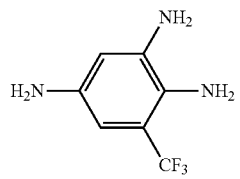
Diamine-16
-continued
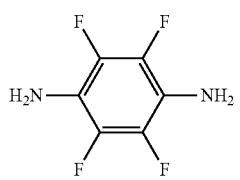
Diamine-17
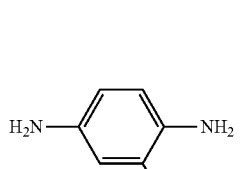
Diamine-18
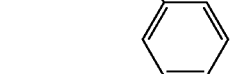
Diamine-19
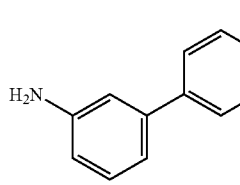
Diamine-20
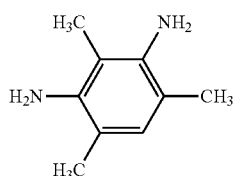
Diamine-31
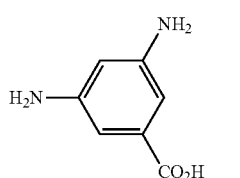
Diamine-32
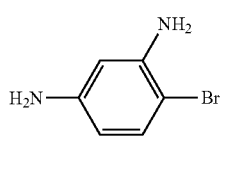
Diamine-33
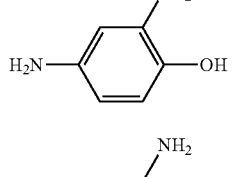
Diamine-34
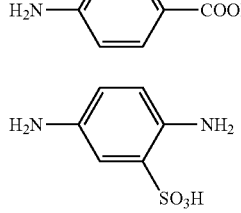
Diamine-35

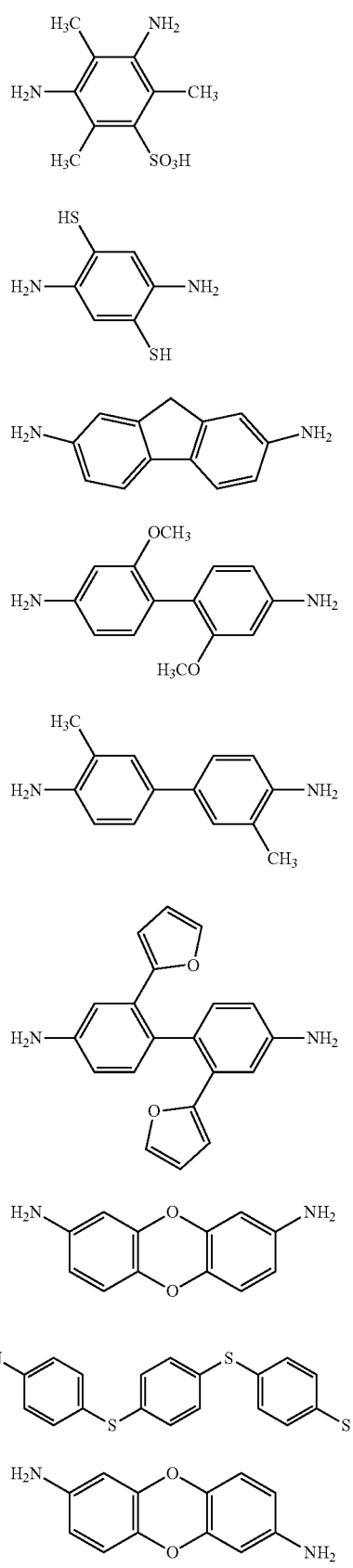
Diamine-36
Diamine-37
Diamine-38
Diamine-39
Diamine-40
Diamine-41
Diamine-42
Diamine-43
Diamine-44
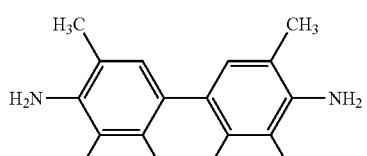
Diamine-45
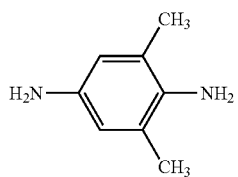
Diamine-46
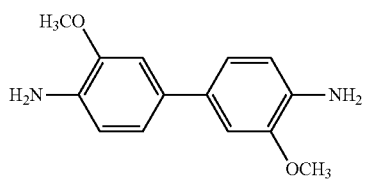
Diamine-47
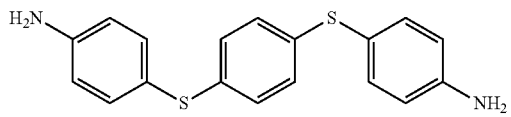
Diamine-48
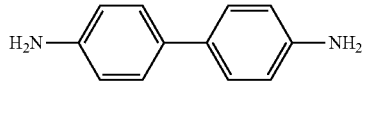
Diamine-49
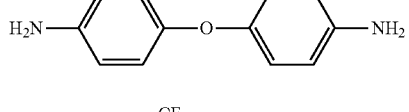
Diamine-50
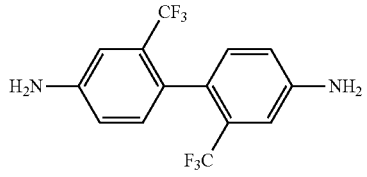
Diamine-51
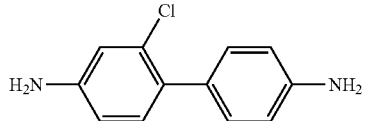
Diamine-52
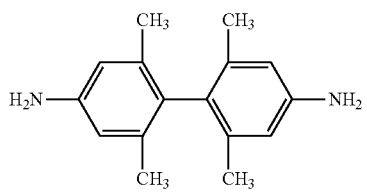
Diamine-53

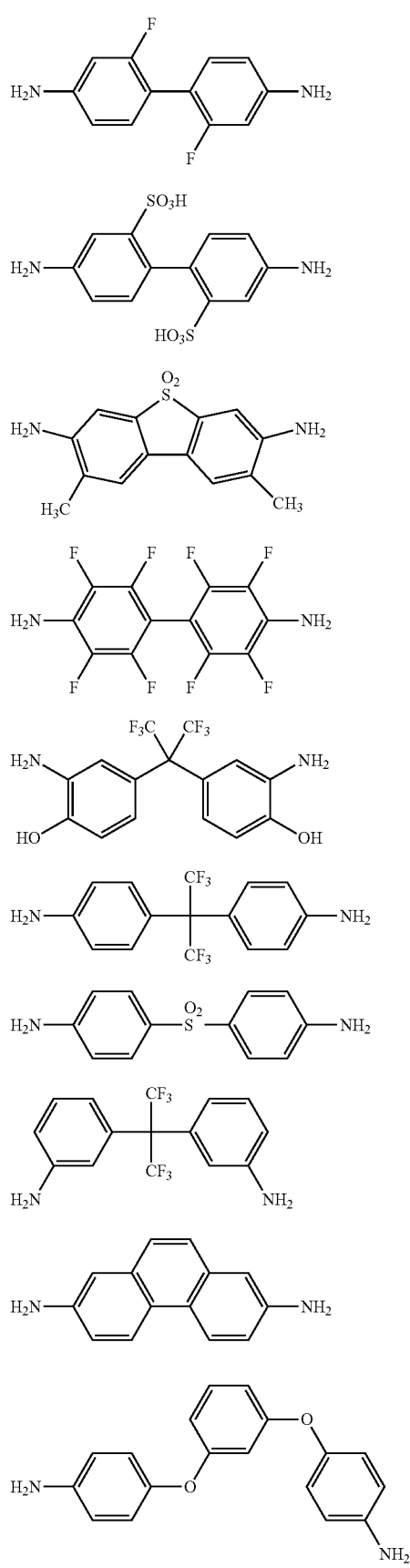
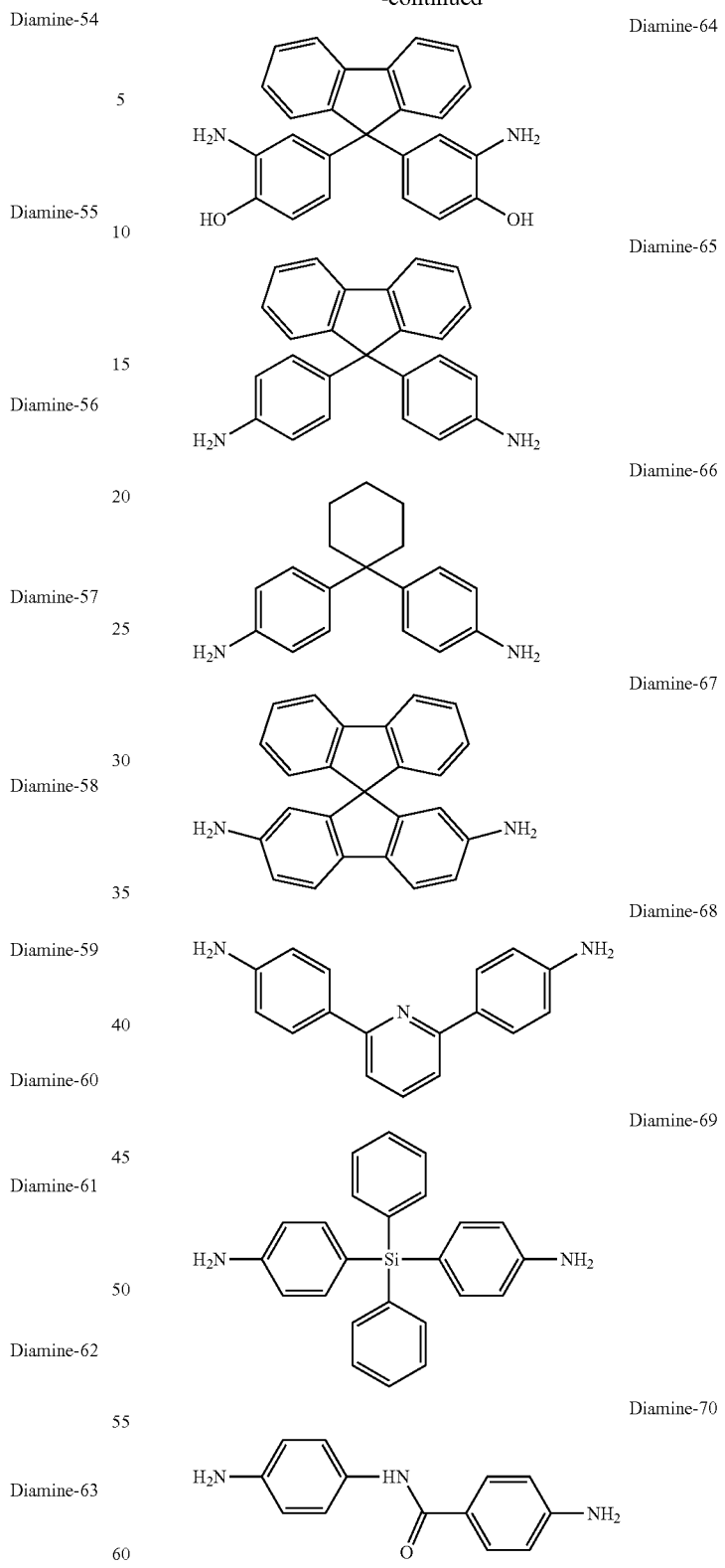
The monomer represented by Formula (IV) and the monomer represented by Formula (V), (VII-a) or (VII-b) may be used as an oligomer or prepolymer in advance. The polyimide used in the present invention may be any of a block copolymer, a random copolymer and a graft copolymer.

As the polyimide represented by Formula (I), polyimide (P-02) used in Examples which will be described later can preferably be used.

As the polyimide described in paragraphs <0040> to <0068> of JP2015-160201A, in the copolymerization ratio (molar ratio) of the polyimide P-100 exemplified in paragraph <0068> of JP2015-160201A, polyimide (P-101) in which x is set to 20 and y is set to 80 can be preferably used.

In addition, in a case where the resin of the separation layer is polyimide, more specifically, MATRIMID 5218 that is put on the market under the trade mark of MATRIMID (registered trademark) registered by Huntsman Advanced Materials GmbH, and P84 and P84HT that are put on the market respectively under the trade names of P84 and P84HT registered by HP Polymers GmbH are preferable.

On the other hand, the resin of the separation layer other than polyimide can be selected from celluloses such as cellulose acetate, cellulose triacetate, cellulose acetate butyrate, cellulose propionate, ethyl cellulose, methyl cellulose, and nitrocellulose.

The degree of substitution of all acyl groups of celluloses that can be used for the separation layer is preferably 2.0 to 2.7. Cellulose acetate commercially available as cellulose acetate L-40 (degree of substitution of acyl group: 2.5, manufactured by Daicel Corporation) can also be preferably used.

Other resins for the separation layer can be selected from polyethylene glycols such as a polymer obtained by polymerizing polyethylene glycol #200 diacrylate (manufactured by Shin-Nakamura Chemical Co., Ltd.), and a polymer described in JP2010-513021A.

<Second Separation Layer>

The gas separation membrane according to the embodiment of the present invention includes the second separation layer, and the second separation layer has a maximum value of an F/C ratio of 0.20 or more, the F/C ratio being a ratio of the number of fluorine atoms to the number of carbon atoms, and an Si/C ration of 0.3 or less in a portion where the F/C ratio is maximum.

(Thickness)

It is preferable that the thickness of the second separation layer is as thin as possible under a condition that high mechanical strength, gas separation selectivity, and gas permeability are imparted.

In the gas separation membrane according to the embodiment of the present invention, the thickness of the second separation layer is preferably 20 to 200 nm, more preferably 20 to 150 nm, and particularly preferably 30 to 100 nm.

(Layer Configuration)

The second separation layer may be a single layer or two or more layers.

The gas separation membrane preferably has one to five second separation layers, more preferably has one to three second separation layers, from the viewpoint of the production cost, particularly preferably has one or two second separation layers, and more particularly preferably has a single layer.

In a case where the second separation layer is formed of two or more layers, the second separation layer may be formed by laminating two or more same or different layers.

(F/C Ratio)

The maximum value of the F/C ratio of the second separation layer, the F/C ratio being a ratio of the number of fluorine atoms to the number of carbon atoms, is 0.20 or more from the viewpoint of suppressing a decrease in gas separation selectivity after exposure to an impurity gas, is preferably 0.2 to 2, and particularly preferably 0.25 to 1.6.

(Si/C Ratio)

The Si/C ratio of the second separation layer in a portion where the F/C ratio is maximum is 0.3 or less, from the viewpoint of gas separation selectivity, is preferably 0.2 or less, more preferably 0.1 or less, and particularly preferably 0.

(Free Volume Diameter of Second Separation Layer)

The free volume diameter of the second separation layer of the gas separation membrane according to the embodiment of the present invention is preferably 0.6 nm or more, more preferably 0.6 to 0.86 nm, and particularly preferably 0.6 to 0.74 nm.

The free volume diameter of the second separation layer can be obtained by calculating a free volume diameter of the second separation layer (the pore diameter of the second separation layer) from $\tau 3$ obtained by a positron extinction method based on the semiempirical formula: S. T. Tao, J. Chem. Phys., 56, 5499 (1972). Specifically, the positron extinction method is a method of evaluating pores (free volume pores) having a pore diameter of about 1 Å to 10 nm, which is difficult to measure using other techniques, using the positron being extremely small. The pore diameter of a layer including a polymer compound such as a polymer can be calculated by analyzing a third component which is a component having a long lifetime with a lifetime spectrum of the positron and measuring the positron lifetime $\tau 3$ of the third component (o-Ps). The positron is connected to the electron in a polymer to form ortho-positronium o-Ps. This o-Ps is considered to be trapped and annihilated in pores. The positron lifetime $\tau 3$ of o-Ps at this time is represented by a function of the radius R of pores. The positron lifetime can be analyzed using a non-linear least square program POSITRONFIT. At the same time, relative strength I3 of the third component which represents the porosity of pores is also calculated.

Further, in a case where an electron linear accelerator-utilizing positron beam device is used, the energy of implanting the positron can be changed so that information of pores in the surface can be more obtained with low energy and the information of pores in the inside can be more obtained with high energy. The information of an area mainly at about y 20 nm from the surface in the depth direction can be obtained in a case where the implanting energy is 1 keV and information of an area mainly at 200 nm from the surface in the depth direction can be obtained in a case where the implanting energy is 3 keV.

In a case where the positron lifetime $\tau 3$ of the third component in a case where the positron is implanted at a strength of 1 keV from the surface of the second separation layer is, for example, 2.14 ns or more, it is assumed that pores having a pore diameter of 0.6 nm or more when averaged are present at about 20 nm, in the depth direction (direction of the support) from the surface of the second separation layer. Since pores having such a pore diameter when averaged are present at about 20 nm, in the depth direction (direction of the support), from the surface of the second separation layer, the second separation layer has pore diameters suitable for separation into $CO_2$ and $CH_4$ and thus gas permeability and gas separation selectivity can be both increased.

(Insolubility in Organic Solvent)

It is preferable that the second separation layer is cross-linked from the viewpoint of rub resistance.

Crosslinking can be confirmed, for example, by insolubilization in an organic solvent.

In the gas separation membrane according to the embodiment of the present invention, it is preferable that the second separation layer is insoluble in an organic solvent containing toluene and heptane at a compositional ratio of 1:1 by mass ratio from the viewpoint of rub resistance.

The second separation layer may be a sol-gel cured product obtained by hydrolysis and polycondensation. In this case, it is preferable that a sol-gel method reaction is initiated or promoted based on photoexcitation.

(Resin of Second Separation Layer)

In the gas separation membrane according to the embodiment of the present invention, it is preferable that the second separation layer includes a resin.

The resin of the second separation layer preferably includes a fluorine atom-containing resin.

The resin of the second separation layer may include other resins.

—Fluorine Atom-Containing Resin—

The fluorine atom-containing resin used as the resin of the second separation layer is not particularly limited.

The term "fluororesin" is a general term for plastics containing fluorine atoms in the molecules, and for example, in a case where fluorine atoms are put in an acrylic resin, the resin becomes a fluorine-containing acrylic resin and is one of fluororesins. Further, a copolymer of a resin containing fluorine atoms and a resin not including a fluororesin includes fluorine atoms in the molecules, and thus is one of fluororesins. As described above, the fluororesin has a very wide range.

Examples of the resin of the second separation layer include a fluorine-containing polyimide described in JP1996-052332A (JP-H08-052332A), a perfluoro resin including a heterocyclic structure in the main chain (perfluorocyclopolymer), a fluoro(meth)acrylate polymer, and a fluoroolefin polymer.

The gas separation membrane according to the embodiment of the present invention preferably includes at least one of a fluoro(meth)acrylate polymer or a fluoroolefin polymer as the resin of the second separation layer.

As the fluoro(meth)acrylate polymer, a polymer obtained by polymerizing a composition including a fluoro(meth)acrylate which is an example of a monomer having a fluorine atom, which will be described later, may be exemplified.

Further, commercially available fluoro(meth)acrylate polymers can be used.

As other fluoro(meth)acrylate polymers, fluorine-containing acrylic acid derivative polymers described in paragraphs <0014> to <0022> of JP1985-118217A (JP-S60-118217A) may be exemplified, the content of which is incorporated herein.

Examples of the fluoroolefin polymer include a homopolymer or copolymer of fluoroolefin and an alternating copolymer of fluoroolefin and vinyl ether.

Examples of the homopolymer or copolymer of fluoroolefin include tetrafluoroethylene resin or oligomer thereof, and tetrafluoroethylene-hexafluoropropylene copolymer resin.

Examples of the alternating copolymer of fluoroolefin and vinyl ether include a tetrafluoroethylene-fluorinated vinyl ether copolymer resin or the like.

Examples of the fluoroolefin polymer include compounds described in paragraph <0011> of JP1993-329343A (JP-H05-329343A) and compounds described in paragraphs <0016> to <0025> of JP2016-503448A, the contents of which are incorporated herein.

As the fluorine atom-containing resin, commercially available products may be used.

Examples of commercially available fluorine atom-containing resins include CYTOP series (CYTOP CTL809M or the like used in Examples, which will be described later) manufactured by Asahi Glass Co. Ltd., Lumiflon series manufactured by Asahi Glass Co. Ltd., Kynar series manufactured by Arkema S.A., FLUONATE series manufactured by DIC Corporation (FLUONATE K-704 or the like used in Examples, which will be described later), MEGAFACE series manufactured by DIC Corporation, DEFENSA OP series manufactured by DIC Corporation, and Nafion series manufactured by Sigma-Aldrich.

—Resin Other than Fluorine Atom-Containing Resin—

As a resin other than the fluorine atom-containing resin used for the second separation layer, a resin obtained by polymerizing and/or crosslinking a monomer other than a halogen atom-containing monomer may be exemplified.

The monomer other than a halogen atom-containing monomer will be described later.

The second separation layer is preferably crosslinked. A resin obtained by using the resin used for the second separation layer described above as a resin precursor and carrying out a crosslinking reaction of the resin precursor may be used as the resin of the second separation layer.

In the gas separation membrane according to the embodiment of the present invention, it is preferable that the resin of the second separation layer preferably includes at least one of an acrylic ester bond, a methacrylic ester bond, a urethane bond, and an ether bond.

As the acrylic ester bond and the methacrylic ester bond, a structure in which a fluoro(meth)acrylate monomer described below is polymerized and/or a structure in which a silicone acrylate based monomer described below is polymerized is preferable.

As the urethane bond, a structure in which a fluoro(meth)acrylate monomer described below is crosslinked with a polymerization initiator (preferably a curing agent, more preferably a polyisocyanate) described later is preferable.

As the ether bond, a bond between a group derived from a polyhydric alcohol contained in the molecule of a fluoro(meth)acrylate monomer described later and a (meth)acryloyl group is preferable.

(Monomer of Second Separation Layer)

As the monomer used for the second separation layer, a monomer having a fluorine atom, and other monomers may be exemplified.

—Monomer Having Fluorine Atom—

As the monomer having a fluorine atom, an F-modified dimethylsiloxane monomer, fluoroacrylate, a fluoroepoxy monomer, a fluoroolefin monomer, and fluoro(meth)acrylate may be exemplified.

Among these, fluoro(meth)acrylate is preferable.

Specifically, (meth)acrylate compounds containing a fluorine atom-containing hydrocarbon group described in paragraphs <0019> to <0026> of JP2014-105271A, and compounds described in paragraphs <0047> to <0060> and <0126> of JP2012-99638A can be used, the contents of which are incorporated herein.

The (meth)acrylate compound containing a fluorine atom-containing hydrocarbon group is preferably a compound represented by Formula (1) or (2).

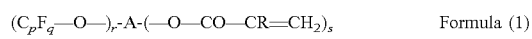

Formula (1)

In Formula (1), p represents an integer of 1 to 18, q represents an integer of 3 to 37, r represents an integer of 1 to 18, s represents an integer of 2 to 19, where r+s is 3 to 20, A represents a dehydroxylated residue of a polyhydric alcohol, and R represents a hydrogen atom or methyl group.

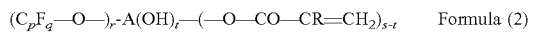  Formula (2)

In Formula (2), p represents an integer of 1 to 18, q represents an integer of 3 to 37, r represents an integer of 1 to 18, s represents an integer of 2 to 19, t represents an integer of 1 to 18, where r+s is 3 to 20, and s>t, A represents a dehydroxylated residue of a polyhydric alcohol, and R represents a hydrogen atom or methyl group.

$C_pF_q$— in Formulae (1) and (2) means a hydrocarbon group containing one or more fluorine atoms, and as long as one or more fluorine atoms are contained, any of linear, branched, or cyclic hydrocarbon groups may be adopted, and a saturated or unsaturated hydrocarbon group may also be adopted. Among these, linear or branched fluoroalkyl group, fluoroalkenyl group, and fluorocycloalkyl group are preferable. p preferably represents 2 to 18, more preferably represents 2 to 12, and still more preferably represents 1 to 10. Examples thereof include a perfluoromethyl group, a difluoroethyl group, a perfluoroethyl group, a pentafluoropropyl group, a perfluoropropyl group, a perfluorooctyl group, a perfluorononyl group, a perfluorocyclopentyl group, and a perfluorocyclohexyl group. Alternatively, the following groups are also preferable (In the formula, * represents a bond).

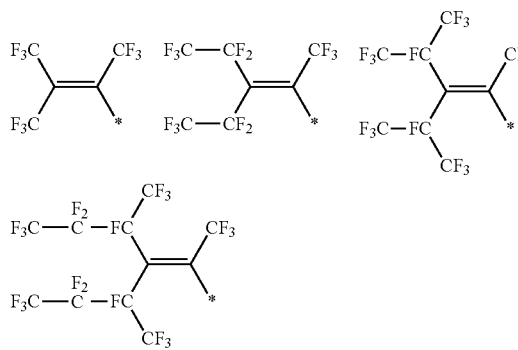

Among these, a perfluoro group in which all hydrogen atoms of hydrocarbons are substituted with fluorine atoms is preferable.

Examples of polyhydric alcohol used for A in Formulae (1) and (2) include pentaerythritol, dipentaerythritol, tripentaerythritol, glycerin, diglycerin, triglycerin, polyglycerin, sorbitol, mannitol, trimethylolpropane, ditrimethylolpropane, trimethylolethane, ditrimethylolethane, bis(dipentaethathritol)adipate, and tris(2-hydroxyethyl)isocyanurate; as well as adducts of alkylene (for example, ethylene, propylene, or butylene) oxide of these polyhydric alcohols; and ε-caprolactone modified products of these polyhydric alcohols.

The dehydroxylated residue refers to a group obtained by removing a hydrogen atom from the hydroxyl group of a polyhydric alcohol.

Examples of (meth)acrylate containing a fluorine atom-containing hydrocarbon group includes a compound represented by Formula (1-1).

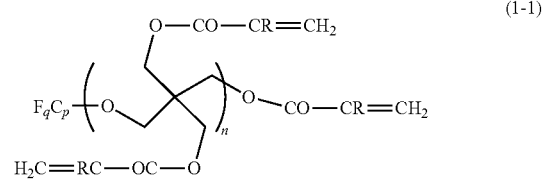

(In Formula (1-1), p, q, and R have the same meaning, n represents an integer of 1 to 5, preferably represents an integer of 1 to 3, and more preferably represents an integer of 1 or 2.)

The compound represented by Formula (1-1) includes a compound represented by Formula (1-2).

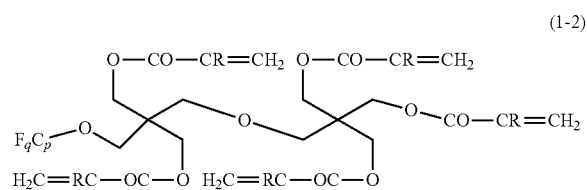

(In Formula (1-2), p, q, and R have the same meaning.)

The (meth)acrylate containing a fluorine atom-containing hydrocarbon group is preferably bi- to hexafunctional, more preferably bi- or trifunctional, and particularly preferably trifunctional. The number of functional groups of the (meth)acrylate containing a fluorine atom-containing hydrocarbon group means the number of —O—CO—CR=CH$_2$ in one molecule.

Examples of the (meth)acrylate containing a fluorine atom-containing hydrocarbon group include triacryloyl pentafluoroethyl pentaerythritol, triacryloyl heptafluoroisopropyl pentaerythritol, triacryloyl heptadecafluorononenyl pentaerythritol, pentaacryloyl pentafluoroethyl dipentaerythritol, pentaacryloyl heptafluoroisopropyl dipentaerythritol, and pentaacryloyl heptafluorononenyl dipentaerythritol.

Examples of the (meth)acrylate further include compounds described in JP2003-313242A.

Specific examples of the monomer having a fluorine atom include the following compounds. The present invention is not limited to the following specific examples.

LINC-3A (manufactured by KYOEISHA CHEMICAL Co., Ltd.):

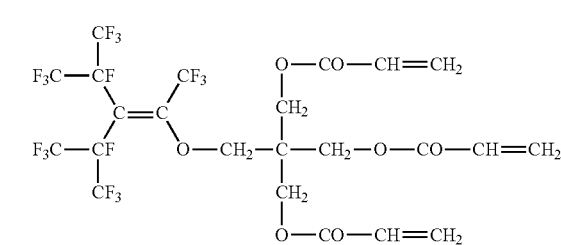

-continued

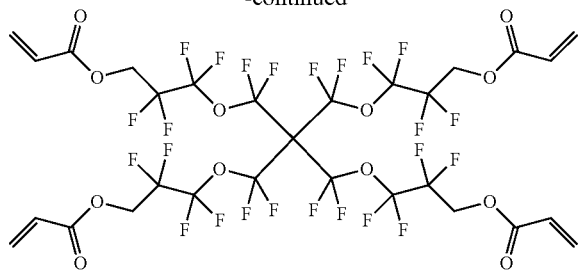

2,2,3,3,4,4,5,5-octafluoro-1,6-hexanediol diacrylate:

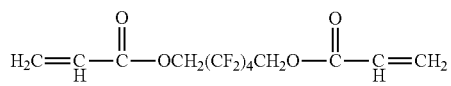

CHEMINOX FAAC 4 (manufactured by Unimatec Co., Ltd.):

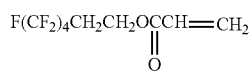

CHEMINOX FAAC 6 (manufactured by Unimatec Co., Ltd.):

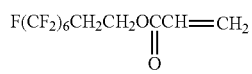

CHEMINOX FAMAC 4 (manufactured by Unimatec Co., Ltd.):

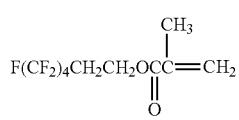

CHEMINOX FAMAC 6 (manufactured by Unimatec Co., Ltd.):

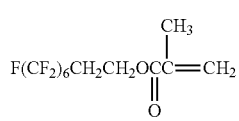

2,2,2-trifluoroethyl methacrylate:

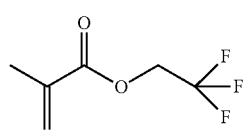

—Fluorine-Containing Surfactant—

As the monomer having a fluorine atom, a fluorine-containing surfactant may be used. In the gas separation membrane according to the embodiment of the present invention, it is preferable that the second separation layer includes a fluorine-containing surfactant.

As the fluorine-containing surfactant, known surfactants can be used. Among these, a fluorine-containing surfactant having an ultraviolet reactive group is preferably used.

Examples of the fluorine-containing surfactant having an ultraviolet reactive group include compounds described in paragraphs <0022> to <0025> of JP2016-011365A, the content of which is incorporated herein.

As the fluorine-containing surfactant, commercially available products can be used.

As a commercially available fluorine-containing surfactant, MEGAFACE RS-75 (manufactured by DIC Corporation, oligomer containing a fluorine group, a hydrophilic group, a lipophilic group and an ultraviolet reactive group) may be exemplified.

—Monomer Other than Monomer Having Fluorine Atom—

The monomer other than the monomer having a fluorine atom may be used.

As the monomer other than the monomer having a fluorine atom, a silicone acrylate-based monomer may be exemplified.

As the material of the silicone acrylate-based monomer, SILAPLANE (registered trademark) FM-0611, SILAPLANE FM-0621, and SILAPLANE FM-0625, both terminal (meth)acrylic SILAPLANE FM-7711, SILAPLANE FM-7721, SILAPLANE FM-7725, and the like, SILAPLANE FM-0411, SILAPLANE FM-0421, SILAPLANE FM-0428, SILAPLANE FM-DA11, SILAPLANE FM-DA21, and SILAPLANE-DA25, single terminal (meth)acrylic SILAPLANE FM-0711, SILAPLANE FM-0721, SILAPLANE FM-0725, SILAPLANE TM-0701, SILAPLANE TM-0701T, and the like, manufactured by JNC Corporation, may be used.

In a case where the monomer having a fluorine atom and another monomer are used in combination, it is preferable that the monomers are used in combination in a range in which the second separation layer satisfies the F/C ratio and the Si/C ratio. For example, it is preferable that the monomers are used in combination such that the ratio of the monomer having a fluorine atom:another monomer is 30 to 99.9:0.1 to 70 (mass ratio). It is more preferable that the monomers are used in combination such that the ratio of the monomer having a fluorine atom:another monomer is 50 to 99.9:0.1 to 50 (mass ratio).

(Polymerization Initiator)

In a case where the resin of the second separation layer is synthesized by the reaction initiated or promoted by photo-excitation, as the material of the second separation layer, known photopolymerization initiators, radical polymerization initiators, and curing agents are preferably used.

As the photopolymerization initiator and the radical polymerization initiator, compounds described in paragraph <0036> of JP2013-111565A may be exemplified, the content of which is incorporated herein.

Examples of known photopolymerization initiator and radical polymerization initiators include benzoin ether, 2,2-dimethoxy-1,2-diphenylethane-1-one [IRGACURE 651, manufactured by BASF, trade name], 1-hydroxy-cyclohexyl-phenyl-ketone [IRGACURE 184, manufactured by BASF, trade name], 2-hydroxy-2-methyl-1-phenyl-propane-1-one [DAROCUR 1173, manufactured by BASF, trade name], 1-[4-(2-hydroxyethoxy)-phenyl]-2-hydroxy-2-methyl-1-propane-1-one [IRGACURE 2959, manufactured by BASF, trade name], 2-hydroxy-1-[4-[4-(2-hydroxy-2-methyl-propionyl)-benzyl]phenyl]-2-methyl-propane-1-one

[IRGACURE 127, manufactured by BASF, trade name], 2-methyl-1-(4-methylthiophenyl)-2-morpholinopropane-1-one [IRGACURE 907, manufactured by BASF, trade name], 2-benzyl-2-dimethylamino-1-(4-morpholinophenyl)-butanone-1 [IRGACURE 369, manufactured by BASF, trade name], 2-(dimethylamino)-2-[(4-methylphenyl)methyl]-1-[4-(4-monopholinyl)phenyl]-butanone [IRGACURE 379, manufactured by BASF, trade name], 2,4,6-trimethylbenzoyl-diphenyl-phosphineoxide [DAROCUR TPO, manufactured by BASF, trade name], bis(2,4,6-trimethylbenzoyl)-phenylphosphine oxide [IRGACURE 819, manufactured by BASF, trade name], bis($\eta^5$-2,4-cyclopentadien-1-yl)-bis(2,6-difluoro-3-(1H-pyrrol-1-yl)-phenyl) titanium [IRGACURE 784, manufactured by BASF, trade name], 1,2-octanedione, 1[4-(phenylthio)-,2-(O-benzoyl oxime)] [IRGACURE OXE-01, manufactured by BASF, trade name], ethanone, 1-[9-ethyl-6-(2-methylbenzoyl)-9H-carbazole-3-yl]-, and 1-(0-acetyl oxime) [IRGACURE OXE-02, manufactured by BASF, trade name].

Further, the photopolymerization initiators and radical polymerization initiators also include a photoacid generator. Examples of the photoacid generator include UV9380C (bis(4-dodecylphenyl)iodonium hexafluoroantimonate, manufactured by Momentive Performance Materials Inc.).

As the curing agent, isocyanates can be used, and an isocyanurate group-containing polyisocyanate is preferable. As the isocyanates, the compounds described in paragraphs <0022> to <0030> of JP2015-113415A may be exemplified, the content of which is incorporated herein.

Examples of known curing agents include "DURANATE TPA-100", "DURANATE TKA-100", and "DURANATE TLA-100", manufactured by Asahi Chemical Corp, "SUMIDULE N3300", "DESMODUR N3600", "DESMODUR N3790BA", "DESMODUR N3900", and "DESMODUR Z4470BA", manufactured by Sumika Bayer Urethane Co., Ltd., "TAKENATE D-170N", manufactured by Mitsui Chemicals, Inc., "BURNOCK DN-980", "BURNOCK DN-981", "BURNOCK DN-990", and "BURNOCK DN-992", manufactured by DIC Corporation, and "CORONATE HX", "CORONATE HXR", and "CORONATE HXLV", manufactured by Nippon Polyurethane Industry Co., Ltd.

The concentration of solid contents of the polymerization initiator is preferably 25% by mass or less, more preferably 0.1% to 15% by mass, and particularly preferably 1% to 10% by mass with respect to the resin precursor (resin or monomer) used for the second separation layer.

These polymerization initiators can be used alone or in combination of two or more thereof.

(Additive)

As the material of the second separation layer, it is preferable that a solvent, a polymerization inhibitor, an acid (for example, acetic acid), and the like is used.

The content ratios of the resin precursor of the second separation layer and each additive are not particularly limited. For example, the following content ratios are preferable.

For example, it is preferable that the mass ratio of the contained resin precursor of the second separation layer is 1% to 20%, the mass ratio of the contained solvent is 50% to 95%, the mass ratio of the contained polymerization inhibitor is 0.01% to 5%, and the mass ratio of contained acetic acid in a case of using acetic acid as an acid is 0.1% to 5%.

(Solvent)

It is preferable that the material of the second separation layer is prepared as a composition including an organic solvent in a case of forming the second separation layer.

In a case where the second separation layer is formed by polymerization reaction or a crosslinking reaction, it is preferable that the material is prepared as a composition for forming a second separation layer precursor. It is preferable that the composition for forming a second separation layer precursor is prepared as the composition which can react according to a sol-gel method.

The solvent used for forming the second separation layer is not particularly limited, and examples thereof include n-heptane, acetic acid, water, n-hexane, 2-butanone, methanol, ethanol, isopropyl alcohol, cyclohexanone, acetone, and dimethyl sulfoxide (DMSO).

<Protective Layer>

It is preferable that the gas separation membrane further has a protective layer.

It is preferable that the protective layer is a layer to be provided on the second separation layer. At the time of handling or use, unintended contact between the second separation layer and another material can be prevented.

It is preferable that the protective layer is a layer provided separately from the second separation layer.

(Material)

The material of the protective layer is not particularly limited.

As the material used for the protective layer, the material the same as the resin contained in the resin layer can be used. Examples of the material used for the protective layer include silicone resin, polyimide, cellulose resin, and polyethylene oxide.

Further, the protective layer may contain a filler. The filler used for the protective layer is not particularly limited. As the filler used for the protective layer, inorganic particles described in paragraphs <0020> to <0027> of JP2015-160201A can be preferably used, and the contents of this publication are incorporated herein by reference.

It is preferable that the protective layer in the gas separation membrane according to the embodiment of the present invention includes a compound having a siloxane bond. In this case, the content of the compound having a siloxane bond in the protective layer is preferably 50% by mass or more, more preferably 90% by mass or more, and particularly preferably 99% by mass or more. It is more particularly preferable that the protective layer is formed of only the compound having a siloxane bond.

The compound having a siloxane bond may be a compound having a repeating unit containing at least a silicon atom, an oxygen atom and a carbon atom. Further, the compound having a siloxane bond may be a compound having a siloxane bond and having a repeating unit, and is preferably a compound having a polysiloxane unit. That is, the compound having a siloxane bond is preferably a silicone resin.

As examples of the silicone resin used for the protective layer, it is preferable that the protective layer contains at least one selected from polydimethylsiloxane (hereinafter, also referred to as PDMS), polydiphenyl siloxane, polydi(trifluoropropyl)siloxane, polymethyl(3,3,3-trifluoropropyl)siloxane, and poly(1-trimethylsilyl-1-propyne) (hereinafter, also referred to as PTMSP). It is more preferable that the silicone resin used for the protective layer contains polydimethylsiloxane or poly(1-trimethylsilyl-1-propyne), and particularly preferable that the protective layer contains polydimethylsiloxane.

The silicone resin used for the protective layer, such as PDMS, has high $CO_2$ gas permeability but also has high permeability for an impurity gas such as BTX, and plasticization of the first separation layer including polyimide having high separation selectivity cannot be suppressed.

In the present invention, by laminating a film with a high fluorine content as the second separation layer, plasticization of the first separation layer including polyimide can be significantly suppressed.

Further, it is preferable to greatly improve plasticization of the first separation layer including polyimide and the like by forming the second separation layer using a crosslinked film.

The silicone resin used for the protective layer, such as PDMS, has a small hardness of 0.7. In a preferable embodiment of the present invention, by forming the second separation layer into a film of high hardness, remarkable defects can be reduced in the modularization handling to spiral round. Particularly, it is preferable to greatly improve rub resistance by forming the second separation layer using a crosslinked film.

Commercially available materials can be used as the silicone resin used for the protective layer. For example, UV9300 (polydimethylsiloxane (PDMS), manufactured by Momentive Performance Materials Inc.), X-22-162C (manufactured by Shin-Etsu Chemical Co., Ltd.), and the like can be preferably used.

The silicone resin used for the protective layer can be prepared as a composition containing an organic solvent during formation of the protective layer, and it is preferable that the composition is a curable composition. The organic solvent which can be used for forming the protective layer containing a silicone resin is not particularly limited, and examples thereof include n-heptane.

(Characteristics)

The thickness of the protective layer can be, for example, 50 to 4000 nm. In the gas separation membrane according to the embodiment of the present invention, the thickness of the protective layer is preferably 100 to 3200 nm from the viewpoint of achieving both of rub resistance and gas permeability, and more preferably 100 to 1000 nm.

In the field of water separation for which high durability is further required than the field of the gas separation membrane, the gas separation membrane is less affected by damage, and the protective layer can be omitted. On the contrary, in a case where the thickness of the separation layer is thin (for example, in a case of 500 nm or less), the gas separation membrane is easily affected by damage. In the field of the gas separation membrane including the present invention, it is preferable to make the membrane thin to the extent that the gas permeability can be increased as much as possible while the rub resistance is held.

<Resin Layer>

In a case where the gas separation membrane according to the embodiment of the present invention is a thin layer composite membrane, it is preferable to provide a resin layer between the first separation layer and the support from the viewpoint of adhesiveness improvement.

The resin layer is a layer including a resin. This resin preferably has a polymerizable functional group. Examples of such a functional group include an epoxy group, an oxetane group, a carboxyl group, an amino group, a hydroxyl group, and a thiol group. More preferably, the resin layer includes an epoxy group, an oxetane group, a carboxyl group, and a resin having two or more of these groups. Such a resin is preferably formed on the support by curing using radiation irradiation of a radiation curable composition.

The polymerizable dialkylsiloxane is a monomer having a dialkylsiloxane group, a polymerizable oligomer having a dialkylsiloxane group, and a polymer having a dialkylsiloxane group. The resin layer may be formed of a partially crosslinked radiation curable composition having a dialkylsiloxane group. As the dialkylsiloxane group, a group represented by $-\{O-Si(CH_3)_2\}_n-$ (n is, for example, 1 to 100) may be exemplified. A poly(dialkylsiloxane) compound having a vinyl group at the terminal can also be preferably used.

The material of the resin layer is preferably at least one selected from polydimethylsiloxane, poly(1-trimethylsilyl-1-propyne), and polyethylene oxide, more preferably polydimethylsiloxane or poly(1-trimethylsilyl-1-propyne), and particularly preferably polydimethylsiloxane.

Commercially available materials can be used as the material of the resin layer. For example, UV9300 (polydimethylsiloxane (PDMS) manufactured by Momentive Performance Materials Inc.), X-22-162C (manufactured by Shin-Etsu Chemical Co., Ltd.) and the like can be preferably used as the resin of the resin layer.

As another material of the resin layer, UV 9380C (bis(4-dodecylphenyl)iodonium hexafluoroantimonate, manufactured by Momentive Performance Materials Inc.) and the like can be preferably used.

The material of the resin layer can be prepared as a composition including an organic solvent in a case of forming the resin layer, and is preferably a curable composition.

The thickness of the resin layer is not particularly limited, but the thickness of the resin layer is preferably 20 to 1000 nm, more preferably 20 to 900 nm, and particularly preferably 30 to 800 nm. The thickness of the resin layer can be obtained using a scanning electron microscope (SEM).

<Characteristics and Applications>

The gas separation membrane according to the embodiment of the present invention can be suitably used as a gas separation membrane to be used in a gas separation recovery method and a gas separation purification method. For example, a gas separation membrane which is capable of efficiently separating specific gas from a gas mixture containing gas, for example, hydrogen, helium, carbon monoxide, carbon dioxide, hydrogen sulfide, oxygen, nitrogen, ammonia, a sulfur oxide, or a nitrogen oxide; hydrocarbon such as methane, or ethane; unsaturated hydrocarbon such as propylene; or a perfluoro compound such as tetrafluoroethane can be obtained.

It is preferable that the gas separation membrane according to the embodiment of the present invention is used to separate at least one kind of acidic gas from a gas mixture of acidic gas and non-acidic gas. Examples of the acidic gas include carbon dioxide, hydrogen sulfide, carbonyl sulfide, a sulfur oxide (SOx), and a nitrogen oxide (NOx). Among these, at least one selected from carbon dioxide, hydrogen sulfide, carbonyl sulfide, a sulfur oxide (SOx), and a nitrogen oxide (NOx) is preferable; carbon dioxide, hydrogen sulfide, or a sulfur oxide (SOx) is more preferable; and carbon dioxide is particularly preferable.

As the non-acidic gas, at least one selected from hydrogen, methane, nitrogen, and carbon monoxide is preferable; methane or hydrogen is more preferable, and methane is particularly preferable. In the gas separation membrane according to the embodiment of the present invention, even in a case where BTX (benzene, toluene, xylene) or a higher order hydrocarbon gas such as propane, butane, or hexane is included as the non-acidic gas, at least one acidic gas can be separated from the gas mixture of acidic gas and non-acidic gas.

It is preferable that the gas separation membrane according to the embodiment of the present invention selectively separates carbon dioxide from the gas mixture including particularly carbon dioxide and hydrocarbon (particularly methane). In addition, it is preferable that the gas separation membrane according to the embodiment of the present invention selectively separates carbon dioxide from the gas mixture including carbon dioxide, hydrocarbon (particularly methane), and higher order hydrocarbon gas.

In addition, in a case where gas subjected to a separation treatment is mixed gas of carbon dioxide and methane, the permeation rate of the carbon dioxide at 30° C. and 5 MPa is preferably 10 GPU or greater, more preferably 10 to 300 GPU, and particularly preferably f 15 to 300 GPU.

Further, 1 GPU is $1\times10^{-6}$ $cm^3(STP)/cm^2$·sec·cmHg.

In the case where the gas separation membrane according to the embodiment of the present invention is a membrane in which the gas subjected to a separation treatment is mixed gas of carbon dioxide and methane, a gas separation selectivity a which is a ratio of the permeation flux of carbon dioxide at 30° C. and 5 MPa to the permeation flux of methane is preferably 30 or greater, more preferably 35 or greater, particularly preferably 40 or greater, and more particularly preferably greater than 50.

<Method of Producing Gas Separation Membrane>

A method of producing a gas separation membrane is not particularly limited.

(Formation of Resin Layer)

It is preferable that the method of producing a gas separation membrane includes a step of forming a resin layer on a support.

A method of forming the resin layer on the support is not particularly limited, and it is preferable to apply a composition including the material of the resin layer and an organic solvent. The coating method is not particularly limited and a known method can be used. For example, a spin coating method, a dip coating method, or a bar coating method can be used as appropriate.

It is preferable that the composition the material of the resin layer and an organic solvent is a curable composition. There is no particular limitation on a method of irradiating the curable composition with radiation in a case of forming the resin layer. Irradiation with an electron beam, an ultraviolet (UV) ray, visible light, or an infrared ray can be used, and radiation can be appropriately selected depending on the material to be used.

It is preferable that the radiation irradiation time is 1 to 30 seconds.

It is preferable that the radiation energy is 10 to 500 mW/cm².

After forming the resin layer on the support, it is preferable to perform a specific treatment on the resin layer before forming the separation layer. As a specific treatment to be applied to the resin layer, an oxygen atom permeation treatment of causing oxygen atoms to permeate into the resin layer is preferable, and a plasma treatment is more preferable.

From the viewpoint of enhancing separation selectivity and enhancing rub resistance to make it difficult to lower the separation selectivity, it is more preferable to perform a plasma treatment for 5 seconds or more under the above conditions. On the other hand, it is preferable to perform the plasma treatment for 1000 seconds or less under the above conditions.

In addition, the cumulative energy amount of the plasma treatment is preferably 25 to 500000 J.

The plasma treatment can be performed by a conventional method. Conventionally, a state in which a treatment object is treated in a large vacuum chamber using a decompression plasma to generate a stable plasma can be exemplified. Recently, an atmospheric pressure plasma treatment device capable of performing processing under an atmospheric pressure atmosphere has been developed. In this case, a gas mainly containing an argon gas is introduced into the process chamber, and the high density plasma can be stably generated under the atmospheric pressure atmosphere. The system configuration of the atmospheric pressure plasma treatment device includes a gas mixing and control section, a reactor, and a transport conveyor (or XY table). A proposal is also made for one for intermittently blowing a plasma jet off from a circular nozzle to perform treatment.

As the plasma treatment condition, the argon flow rate is preferably 5 to 500 $cm^3(STP)/min$, more preferably 50 to 200 $cm^3(STP)/min$, and particularly preferably 80 to 120 $cm^3(STP)/min$. The oxygen flow rate is preferably 1 to 100 $cm^3(STP)/min$ and more preferably 5 to 100 $cm^3(STP)/min$. STP is abbreviation of standard temperature and pressure.

As the plasma treatment condition, the degree of vacuum is preferably 0.6 to 15 Pa.

As the plasma treatment condition, the discharge output is preferably 5 to 200 W.

(Formation of First Separation Layer)

A method of forming the first separation layer is not particularly limited, and the first separation layer may be formed by obtaining a commercially available product of a known material, may be formed according to a known method, or may be formed according to a method described below using a specific resin.

As for the method of forming the first separation layer, it is preferable that an underlayer (for example, a support or a resin layer) is coated with the composition including the material of the first separation layer and an organic solvent. The coating method is not particularly limited and the coating can be performed according to a known method, for example, a spin coating method.

The condition for forming the first separation layer of the gas separation membrane is not particularly limited and the temperature is preferably −30° C. to 100° C., more preferably −10° C. to 80° C., and particularly preferably 5° C. to 50° C.

(Formation of Second Separation Layer)

A method of forming the second separation layer is not particularly limited. The second separation layer may be formed by using a commercially available known material or a known method or may be formed using a specific resin by a method described below.

As for the method of forming the second separation layer, it is preferable that an underlayer (for example, a support or a resin layer) is coated with the composition including the material of the second separation layer and an organic solvent. In a case where the second separation layer is a layer of a surfactant, the first separation layer and the second separation layer which is a layer of a surfactant may be simultaneously formed by further adding a surfactant to the composition including the material of the first separation layer and an organic solvent and coating the underlayer with the composition. The coating method is not particularly limited and the coating can be performed according to a known method, for example, a spin coating method.

The condition for forming the second separation layer of the gas separation membrane is not particularly limited and the temperature is preferably −30° C. to 100° C., more preferably −10° C. to 80° C., and particularly preferably 5° C. to 50° C.

The second separation layer is preferably formed by crosslinking. In a case where the second separation layer is formed by crosslinking, it is preferable that the second separation layer is formed of a composition for forming a second separation layer including a resin precursor (resin and/or monomer) and a polymerization initiator having a concentration of solid contents of 3% to 20% by mass with respect to the resin precursor.

(Formation of Protective Layer)

The method of forming a protective layer on the surface-treated surface of the second separation layer is not particularly limited, but it is preferable to coat the surface with the composition containing an organic solvent and the material of the protective layer. Examples of the organic solvent include organic solvents used to form the first separation layer. The coating method is not particularly limited and a known method can be used. For example, the coating can be performed using a spin coating method.

Although a method of irradiating the curable composition for forming a protective layer is not particularly limited, an electron beam, an ultraviolet (UV) ray, visible light, or an infrared ray can be used, and radiation can be appropriately selected depending on the material to be used.

It is preferable that the radiation irradiation time is 1 to 30 seconds.

It is preferable that the radiation energy is 10 to 500 mW/cm$^2$.

<Method of Separating Gas Mixture>

Using the gas separation membrane according to the embodiment of the present invention, it is possible to perform separation of a gas mixture.

In the method of separating a gas mixture using the gas separation membrane according to the embodiment of the present invention, the components of the gas mixture of raw materials are affected by the production area of the raw materials, the applications, or the use environment and are not particularly defined. However, it is preferable that the main components of the gas mixture are carbon dioxide and methane, carbon dioxide and nitrogen, or carbon dioxide and hydrogen, and BTX (benzene, toluene, xylene) and a higher order hydrocarbon gas such as propane, butane, or hexane are included as impurities.

The ratio of carbon dioxide in the gas mixture is preferably 5% to 50% by volume and more preferably 10% to 40% by volume. The ratio of the higher order hydrocarbon gas in the gas mixture is preferably 0.1% to 90% by volume and more preferably 1% to 50% by volume. In a case where the gas mixture is present in the coexistence of an acidic gas such as carbon dioxide or hydrogen sulfide, the method of separating the gas mixture using the gas separation membrane according to the embodiment of the present invention exhibits particularly excellent performance. Preferably, the method thereof exhibits excellent performance at the time of separating carbon dioxide and hydrocarbon such as methane, carbon dioxide and nitrogen, or carbon dioxide and hydrogen.

It is preferable that the gas separation membrane according to the embodiment of the present invention allows carbon dioxide to selectively permeate from the mixed gas including carbon dioxide gas other than carbon dioxide. It is preferable that the method of separating a gas mixture includes a process of allowing carbon dioxide to selectively permeate from the mixed gas including carbon dioxide and methane. The pressure during gas separation is preferably 3 MPa to 10 MPa, more preferably 4 MPa to 7 MPa, and particularly preferably of 5 MPa to 7 MPa. Further, the temperature during gas separation is preferably −30° C. to 90° C. and more preferably 15° C. to 70° C.

[Gas Separation Membrane Module]

A gas separation membrane module of the present invention has the gas separation membrane according to the embodiment of the present invention.

Examples of the gas separation membrane module include a spiral type module, a hollow fiber type module, a pleated module, a tubular module, and a plate & frame type module.

The gas separation membrane module may be produced by being cut out from the gas separation membrane in a roll shape.

[Gas Separation Device]

A gas separation device according to an embodiment of the present invention includes has the gas separation membrane module according to the embodiment of the present invention.

As the gas separation device according to the embodiment of the present invention, a gas separation device having means for performing separation and recovery of gas or performing separation and purification of gas can be obtained.

The gas separation device according to the embodiment of the present invention may be applied to a gas separation and recovery device which is used together with an absorption liquid described in JP2007-297605A according to a membrane/absorption hybrid method.

EXAMPLES

The characteristics of the present invention will be described in detail with reference to Examples and Comparative Examples (Comparative Examples do not correspond to known techniques) described below. The materials, the amounts to be used, the ratios, the treatment contents, and the treatment procedures shown in the examples described below can be appropriately changed as long as it is within the gist of the present invention. Accordingly, the scope of the present invention should not be limitatively interpreted by the specific examples described below.

Moreover, "part" and "%" in the sentences are on a mass basis unless otherwise noted.

Comparative Example 1

<Preparation of Resin Layer>

(Preparation of Radiation Curable Polymer Having Dialkylsiloxane Group)

An n-heptane solution including 39.087% by mass of commercially available UV9300 (polydimethylsiloxane (PDMS) having the following structure, manufactured by Momentive Performance Materials Inc., the epoxy equivalent weight was 950 g/mol of oxirane, and the weight-average molecular weight obtained by using a viscosity measurement method was 9000), 10.789% by mass of commercially available X-22-162C (both terminal carboxyl modified silicone having the following structure, manufactured by Shin-Etsu Chemical Co., Ltd., weight-average molecular weight: 4600), and 0.007% by mass of DBU (1,8-diazabicyclo[5.4.0]undec-7-ene) was prepared in a three-neck flask. The solution was maintained at 95° C. for 168 hours, thereby obtaining a radiation curable polymer solution (viscosity of 22.8 mPa·s at 25° C.) having a poly(siloxane) group.

UV9300 (Chemical Abstracts Service: CAS No.: 67762-95-2)

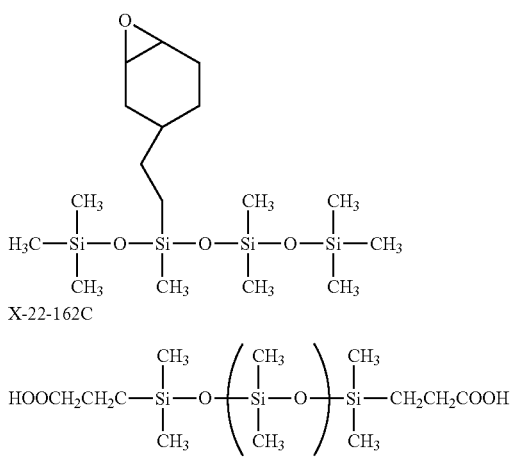

X-22-162C (Preparation of Polymerizable Radiation Curable Composition)

The radiation curable polymer solution was cooled to 20° C. and was diluted with addition of n-heptane until the concentration reached 5% by mass. The obtained solution was filtered using a filter paper having a filtration accuracy of 2.7 μm to prepare a radiation curable composition. 0.1% by mass of UV9380C (45% by mass of bis(4-dodecylphenyl)iodonium hexafluoroantimonate, manufactured by Momentive Performance Materials Inc., alkyl glycidyl ether solution) as a photopolymerization initiator and 0.1% by mass of Ti(OiPr)$_4$ (titanium (IV) isopropoxide manufactured by Dorf Ketal Chemicals) were added to the radiation curable composition, thereby preparing a polymerizable radiation curable composition.

(Coating Porous Support with Polymerizable Radiation Curable Composition and Formation of Resin Layer)

A polyacrylonitrile (PAN) porous membrane (the polyacrylonitrile porous membrane was present on non-woven fabric, the thickness of the film including the non-woven fabric was approximately 180 μm) was used as a support, and the support was spin-coated with the polymerizable radiation curable composition, subjected to a UV treatment (Light Hammer 10, manufactured by Fusion UV System Corporation, D-VALVE) under the conditions of a UV intensity of 24 kW/m for a treatment time of 10 seconds, and then dried. In this manner, a resin layer having a thickness of 600 nm was formed on the porous support.

<Preparation of First Separation Layer>

(Synthesis of Polyimide (P-02))

Diamine 1 used for synthesis of polyimide (P-02) was synthesized in the following reaction scheme.

(Synthesis of Intermediate 1)

Diaminocyclohexylphosphoric acid (manufactured by Wako Pure Chemical Industries, Ltd.) (60 g), acetonitrile (manufactured by Wako Pure Chemical Industries, Ltd.) (380 g), and pyridine (manufactured by Wako Pure Chemical Industries, Ltd.) (23 g) were placed in a flask. Trifluoroacetic acid anhydride (115 g) (manufactured by Wako Pure Chemical Industries, Ltd.) was carefully added dropwise under cooling with ice, and the mixture was allowed to react at 70° C. for 2 hours. After cooling, methanol (manufactured by Wako Pure Chemical Industries, Ltd.) (30 g) was added thereto and the mixture was stirred for 1 hour. After concentration under reduced pressure, purification was performed using hydrochloric acid to obtain an intermediate 1 (110 g).

(Synthesis of Intermediate 2)

Acetonitrile (manufactured by Wako Pure Chemical Industries, Ltd.) (440 mL) and the intermediate 1 (68 g) were placed in a flask. After thionyl chloride (manufactured by Wako Pure Chemical Industries, Ltd.) (115 g) and dimethylformamide (manufactured by Wako Pure Chemical Industries, Ltd.) (0.9 g) were carefully added thereto, the internal temperature was raised to 70° C. while paying attention to heat generation and foaming. After distillation under reduced pressure, the reaction mixture was poured into ice, and the precipitate was purified to obtain an intermediate 2 (65 g).

(Synthesis of Intermediate 3)

Ammonia water (manufactured by Wako Pure Chemical Industries, Ltd.) (90 g) was placed in a flask. A solution obtained by suspending the intermediate 2 (43 g) in tetrahydrofuran (manufactured by Wako Pure Chemical Industries, Ltd.) (130 g) was carefully added to thereto under cooling with ice. After stirring was performed at 40° C. for 2 hours, the mixture was concentrated under reduced pressure and purified to obtain an intermediate 3 (30 g).

(Synthesis of Diamine 1)

The intermediate 3 (30 g), methanol (manufactured by Wako Pure Chemical Industries, Ltd.) (100 g) were placed in a 200 mL flask. Methanesulfonic acid (manufactured by Wako Pure Chemical Industries, Ltd.) (30 g) was carefully added to thereto, the temperature was raised while paying attention to heat generation, and stirring was performed at 120° C. for 30 minutes. After cooling, the reaction solution was poured into a potassium carbonate solution, and the precipitate was purified to obtain diamine 1 (11 g).

(Synthesis of Polyimide (P-02))

Metacresol (manufactured by Wako Pure Chemical Industries, Ltd.) (100 g), diamine 1 (9.00 g), 3,5-diaminobenzoic acid (manufactured by Tokyo Chemical Industry Co., Ltd.) (0.66 g), and 6FDA (manufactured by Tokyo Chemical Industry Co., Ltd.) (19.37 g) were placed in a flask. After toluene (manufactured by Wako Pure Chemical Industries, Ltd.) (10 g) and isoquinoline (manufactured by Wako Pure Chemical Industries, Ltd.) (1.5 g) were added thereto, the mixture was heated to 180° C. and allowed to react for 6 hours. After cooling, the resultant was diluted with acetone (manufactured by Wako Pure Chemical Industries, Ltd.) and then isopropyl alcohol (manufactured by Wako Pure Chemical Industries, Ltd.) was added thereto to obtain a polymer as a solid. The same reprecipitation was repeated twice, followed by drying at 80° C. to obtain polyimide (P-02) (22 g).

In Tables 3 to 5 below, the polyimide (P-02) was abbreviated as PI (P-02). Polyimide (P-02)

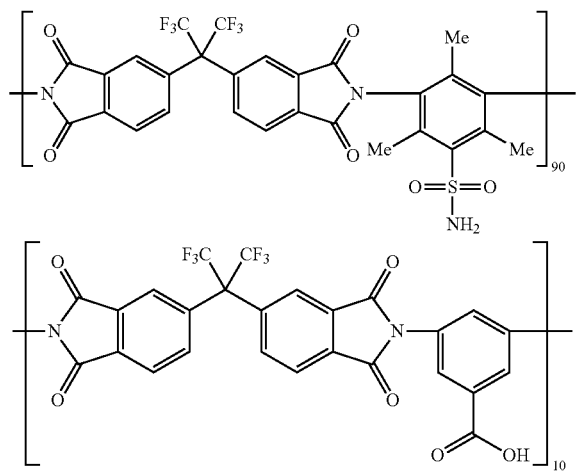

(Formation of First Separation Layer)

For a laminate in which a resin layer having a thickness of 600 nm was formed on the porous support, a plasma treatment was performed on the resin layer for 5 seconds under plasma treatment conditions of an oxygen flow rate of 50 cm$^3$(STP)/min, an argon flow rate of 100 cm$^3$(STP)/min, and a discharge output of 10 W. 1.4 g of polyimide (P-02) having a reactive group and 8.6 g of methyl ethyl ketone were mixed in a brown vial and the mixture was stirred at 25° C. for 30 minutes to prepare a solution for forming a first separation layer.

Thereafter, the stirred solution for forming a first separation layer was applied to the plasma-treated surface of the resin layer and dried to form a first separation layer having a thickness of 70 nm.

(Si/C Ratio of First Separation Layer)

The Si/C ratio which is a ratio of the number of silicon atoms to the number of carbon atoms at the interface of the first separation layer on the second separation layer side was not present (in a case where the second separation layer was not present, the surface on a side opposite to the side in contact with the resin layer) was calculated using electron spectroscopy for chemical analysis (ESCA).

The Si/C ratio of the first separation layer was calculated in the same manner as in the calculation of the Si/C ratio of the second separation layer which will be described later. As a result, the Si/C ratio of the first separation layer was 0.

<Formation of Protective Layer>

Thereafter, the polymerizable radiation curable composition used for the formation of the resin layer was applied on the first separation layer and then subjected to a UV treatment under the same UV treatment conditions as in the formation of the resin layer. Thus, a protective layer having a thickness of 600 nm was formed and dried on the first separation layer at 50° C.

The obtained gas separation membrane was used as a gas separation membrane of Comparative Example 1.

Comparative Example 2

<Formation of Second Separation Layer>

Poly[(1-trimethylsilyl)-1-propyne] (PTMSP) (GELEST, SSP-070) was dissolved in toluene such that the concentration reached 1% by mass and a composition (1) for forming a second separation layer was prepared.

The composition (1) for forming a second separation layer was applied to the first separation layer obtained in Comparative Example 1 and dried, and a second separation layer having a thickness of 80 nm was laminated.

<Formation of Protective Layer>

Thereafter, the polymerizable radiation curable composition used for forming the resin layer in Comparative Example 1 was applied to the second separation layer, and then a UV treatment was performed under the same UV treatment conditions as the formation of the resin layer. Thus, a protective layer having a thickness of 600 nm was formed on the second separation layer and dried at 50° C.

The obtained gas separation membrane was used as a gas separation membrane of Comparative Example 2.

Example 1

<Formation of Second Separation Layer>

LINC-3A (fluoromethacrylate as triacrylate heptadecafluorononyl pentaerythritol, manufactured by Kyoeisha Chemical Co., Ltd.), and a polymerization initiator IRGACURE 127 (abbreviated as Irg 127, manufactured by BASF) were dissolved in a solvent in which the ratio of heptane to butanol was 9:1 such that the concentration of solid contents of the polymerization initiator reached to 3% by mass with respect to LINC-3A to prepare a composition (2) for forming a second separation layer.

The composition (2) for forming a second separation layer was applied to the first separation layer obtained in Comparative Example 1 such that the thickness of the second separation layer was 20 nm.

Thereafter, the composition (2) for forming a second separation layer was subjected to a crosslinking reaction under the following conditions and a 20 nm second separation layer was laminated.

A UV treatment (Light Hammer 10, manufactured by Fusion UV System Corporation, H-barb) was conducted under the condition of a UV-A (ultraviolet A; ultraviolet ray in a range of 400 to 320 nm) dose of 0.23 J/cm$^2$, and dried.

<Formation of Protective Layer>

Thereafter, the polymerizable radiation curable composition used for forming the resin layer in Comparative Example 1 was applied to the second separation layer and then a UV treatment was performed under the same UV treatment conditions as the formation of the resin layer. Thus, a protective layer having a thickness of 600 nm was formed on the second separation layer and dried at 50° C.

A composite membrane having the porous support, the resin layer, the first separation layer, the second separation layer, and the protective layer obtained was used as a gas separation membrane of Example 1.

<Thickness of Second Separation Layer, F/C ratio, and Si/C Ratio>

The center of the obtained gas separation membrane was sampled and the maximum value of the F/C ratio which is a ratio of the number of fluorine atoms to the number of carbon atoms was calculated using electron spectroscopy for chemical analysis (ESCA). In the same manner, the Si/C ratio in a portion where the F/C ratio is maximum was also calculated using ESCA.

The sample of the gas separation membrane having the support, the resin layer, the first separation layer, the second separation layer, and the protective layer was placed in an ESCA device (Quantera SXM, manufactured by Physical Electronics, Inc.). Under the conditions of an X-ray source: Al-Kα ray (1490 eV, 25 W, diameter: 100 μm), a measurement region: 300 μm×300 μm, a pass energy: 55 eV, and a step of 0.05 eV, the F/C ratio and the Si/C ratio of the second separation layer were calculated.

In order to obtain the thickness of the second separation layer and the F/C ratio and the Si/C ratio in each portion of the second separation layer in the thickness direction, etching was performed using $C_{60}$ ions. That is, a region of 2 mm×2 mm was etched in a direction from the surface of the sample on the side opposite to the first separation layer to the inner side of the second separation layer by using a $C_{60}$ ion gun attached to Quantera SXM manufactured by Physical Electronics, Inc. and setting the ion beam intensity to $C_{60}^+$: 10 keV, and 10 nA.

The sample not having the first separation layer was etched in a direction from the surface of the sample on the side opposite to the support to the inner side of the second separation layer. The ratio in the portion where the F/C ratio, which is a ratio of the number of fluorine atoms to the number of carbon atoms, is maximum (the surface having the maximum F/C ratio) was calculated using the ESCA device.

A distance (depth) from "the interface of the second separation layer on the side opposite to the first separation layer" to "the interface of the second separation layer on the first separation layer side" was set to the thickness of the second separation layer. The distance of the second separation layer in the thickness direction was calculated from an etching rate of 10 nm/min of the second separation layer material. This value could be obtained from the change of the material and the optimal numerical value for the material is used as appropriate.

However, in Example 8, the upper side of the second separation layer was set to "the surface of the second separation layer on the side opposite to the first separation layer".

<Free Volume Diameter of Second Separation Layer>

(Measurement of Positron Lifetime of Third Component)

A 1.5 cm×1.5 cm square test piece was cut out from the obtained gas separation membrane, the conditions for etching the protective layer until the interface with the second separation layer was exposed by etching using ESCA were calculated, and the sample etched under the same conditions was prepared.

The obtained sample was attached to a commercially available Si wafer and vacuum-degassed at room temperature (25° C.), and then the lifetime of the third component was measured under the conditions shown in Table 1 below. Under the conditions shown in Table 1 below, the lifetime of the third component is unambiguously defined.

TABLE 1

| Measurement device | Small electron beam generator manufactured by FUJI IMVAC INC. PALS-200A (positron lifetime measurement device for thin film) |
|---|---|
| Positron source | $^{22}$Na-based positron beam |
| Gamma ray detector | BaF$_2$ scintillator + photomultiplier |
| Device constant | Value appropriately determined by device (In this measurement, 263 to 280 ps, 25.55 ps/ch) |
| Beam intensity | 1 keV |
| Measurement temperature | Room temperature (25° C.) |
| Measurement atmosphere | Vacuum |
| Total count number | 5,000,000 counts |

Based on the non-linear least-squares program POSITRONFIT, the obtained data were analyzed for the third component, and the positron lifetime τ3 (ns) of the third component was calculated with respect to a beam intensity of 1 keV (P. Kirkegaard, M. Eldrup, O. E. Mogensen, N. J. Pedersen, Computer Physics Communications, 23, 307 (1981)).

From the positron lifetime τ3 of the third component, the free volume diameter of the second separation layer (the pore diameter of the second separation layer) was calculated based on the semiempirical formula: S. T. Tao, J. Chem. Phys., 56, 5499 (1972)).

The free volume diameter of each second separation layer was shown in Tables 3 to 5 below.

<Insolubility of Second Separation Layer in Organic Solvent>

With respect to the gas separation membrane of each of Examples and Comparative Examples, a sample piece having a cross section was prepared by frozen activation.

Etching and ESCA were alternately performed on the test piece before immersion in a solvent containing toluene and heptane for 1 day, and the F/C ratio of the second separation layer was measured. Further, the XRF intensity of the fluorine atom in X-ray fluorescence (XRF) in a portion where the F/C ratio of the second separation layer is maximum was measured by exposing the surface alternately using etching and ESCA.

The sample piece was immersed in an organic solvent containing toluene and heptane at a compositional ratio of 1:1 by mass ratio for 1 day. Thereafter, etching and ESCA were alternately performed and the F/C ratio of the second separation layer was measured. The XRF intensity of the fluorine atom in the fluorescent X-ray analysis in the portion where the F/C ratio of the second separation layer is maximum was measured by alternately performing etching and ESCA and exposing the surface.

The XRF intensity of the fluorine atom in the fluorescence X-ray analysis of the second separation layer was measured by the following method.

The XRF intensity in the present invention indicates a value measured by the following method.

The amount of F atoms (F mg/m$^2$) is measured by a calibration curve method using an X-ray fluorescence spectrometer (XRF). The type of the X-ray fluorescence spectrometer is not particularly limited, but in the present invention, the amount of F atoms is adopted under the following conditions using RIX 3000 manufactured by Rigaku Denki Kogyo Kabushiki Kaisha.

Device: RIX3000 manufactured by Rigaku Denki Kogyo Kabushiki Kaisha

X-ray tube: Rh, Tube voltage: 50 kV, Tube current: 50 mA, Slit: COARSE, Analyzing crystal: RX4, Detector: F-PC, Analyzed area: diameter of 30 mm, Background (2θ): 140.70 deg., 146.85 deg., Integration time: 80 sec/sample The insolubility of the second separation layer in the organic solvent was evaluated based on the following standards using the measurement results of the variation of the maximum value of the F/C ratio and the variation of the XRF intensity of the fluorine atom in the fluorescent X-ray analysis.

A: Insoluble in Organic Solvent (both of the variation of the maximum value of the F/C ratio and the variation of the XRF intensity of the fluorine atom in the fluorescence X-ray analysis before and after immersion in an organic solvent containing toluene and heptane at a compositional ratio of 1:1 by mass ratio for 1 day were less than 30%).

C: Soluble in Organic Solvent (any one of the variation of the maximum value of the F/C ratio or the variation of the XRF intensity of the fluorine atom in the fluorescence X-ray analysis before and after immersion in an organic solvent containing toluene and heptane at a compositional ratio of 1:1 by mass ratio for 1 day was 30% or more).

The obtained results are shown in Tables 3 to 5 below. The insolubility of the second separation layer in the organic solvent was similarly evaluated for the three kinds of an organic solvent constituted of toluene, an organic solvent constituted of heptane, and an organic solvent constituted of methyl ethyl ketone. As a result, the evaluation results were the same as in a case of using an organic solvent containing toluene and heptane at a compositional ratio of 1:1.

Examples 2 to 15 and Comparative Example 6 and 7

A gas separation membranes of reach of Examples and Comparative Examples was produced in the same manner in Example 1 except that in Example 1, the resin or the monomer of the second separation layer, the kind and the concentration of solid contents of polymerization initiator, and the thickness of the second separation layer were changed as shown in Tables 3 to 5 below.

However, in Examples 8 and 13 in which the polymerization initiator was not used, a crosslinking reaction was not conducted.

<Resin or Monomer of Second Separation Layer>

Bifunctional F (1,6-Bis(acryloyloxy)-2,2,3,3,4,4,5,5-octafluorohexane (CAS No: 2264-01-9, Product Code: B2340), manufactured by Tokyo Chemical Industry Co., Ltd., fluoro(meth)acrylate monomer)

CYTOP (trade name: CYTOP CTL-809M, manufactured by Asahi Glass Co. Ltd., fluoroolefin polymer)

FLUONATE (trade name: FLUONATE K-704, manufactured by DIC Corporation, hydroxyl group-containing fluoroolefin polymer)

FM7721 (trade name: SILAPLANE FM-7721, manufactured by JNC Corporation, silicone acrylate-based monomer)

In Table 6 below, Linc-3A(80)/FM7721(20) means that 80% by mass of Linc-3A and 20% by mass of FM7721 are used in combination. Linc-3A(50)/FM7721(50) means that 50% by mass of Linc-3A and 50% by mass of FM7721 are used in combination. Linc-3A(20)/FM7721(80) means that 20% by mass of Linc-3A and 80% by mass of FM7721 are used in combination.

<Polymerization Initiator of Second Separation Layer>

BURNOCK DN-980 (polyisocyanate prepolymer: solid content=75% by mass, manufactured by DIC Corporation, also referred to as a curing agent)

Comparative Example 3

For the laminate in which the resin layer having a thickness of 600 nm was formed on the porous support prepared in Comparative Example 1, a plasma treatment was performed on the resin layer in the same manner as in Comparative Example 1.

Thereafter, the composition (2) for forming a second separation layer prepared in Example 1 was applied to the plasma-treated surface of the resin layer so that the second separation layer had a thickness of 40 nm.

Thereafter, the composition (2) for forming a second separation layer was subjected to a crosslinking reaction under the same conditions as in Example 1 to form a second separation layer having a thickness of 40 nm.

Thereafter, a protective layer was formed on the second separation layer in the same manner as in Example 1.

A composite membrane having the porous support, the resin layer, the second separation layer, and the protective layer obtained was used as a gas separation membrane of Comparative Example 3.

Comparative Examples 4 and 5

Gas separation membranes of Comparative Examples 4 and 5 were produced in the same manner as in Comparative Example 3 except that in Comparative Example 3, the resin or the monomer of the second separation layer, the polymerization initiator, and the thickness of the second separation layer were changed as shown in Table 4 below.

However, in Comparative Examples 4 and 5 in which the polymerization initiator was not used, a crosslinking reaction was not conducted.

Example 16

To the solution for forming a first separation layer prepared in Comparative Example 1, a fluorine-containing surfactant MEGAFACE RS-75 (manufactured by DIC Corporation) was added in an amount of 10% by mass based on polyimide (P-02) having a reactive group, which is polyimide, so that a solution (A) for forming a first separation layer was prepared.

The stirred solution (A) for forming a first separation layer was applied to the plasma-treated surface of the resin layer and dried in the same manner as in Comparative Example 1 except that the solution (A) for forming a first separation layer was used. As a result, the first separation layer and the second separation layer (the layer formed by unevenly distribution of the fluorine-containing surfactant) were simultaneously formed.

Thereafter, a protective layer was formed on the second separation layer in the same manner as in Comparative Example 2.

The obtained gas separation membrane was used as a gas separation membrane of Example 16.

Comparative Example 8 and Examples 17 to 20

Gas separation membranes of Comparative Example 8 and Examples 17 to 20 were produced in the same manner as in Comparative Example 1, and Examples 2, 3, 11, and 12 except that the resin used for the first separation layer was changed from the polyimide (P-02) to polyimide (P-101).

<Preparation of First Separation Layer>
(Synthesis of Polyimide (P-101))
Polyimide (P-101) was synthesized in the following reaction scheme.

at 40° C. After the reaction solution was stirred at 40° C. for 2.5 hours, 2.94 g (0.037 mol) of pyridine (manufactured by Wako Pure Chemical Industries, Ltd.) and 31.58 g (0.31 mol) of acetic anhydride (manufactured by Wako Pure Chemical Industries, Ltd.) were respectively added to the reaction solution, and the solution was further stirred at 80° C. for 3 hours. Then, 676.6 mL of acetone was added to the reaction solution so that the solution was diluted. An acetone diluent of the reaction solution was added dropwise to a solution obtained by adding 1.15 L of methanol and 230 mL of acetone to a stainless steel container and stirring the mixture. The obtained polymer crystals were suctioned and filtered and then air-dried at 60° C., thereby obtaining 50.5 g of a polymer (P-101). In Table 5 below, the polyimide (P-101) was abbreviated as PI (P-101).

[Evaluation]
<Gas Separation Selectivity>

The gas separation selectivity of the gas separation membrane of each of Examples and Comparative Examples was evaluated using a SUS316 STAINLESS STEEL CELL (manufactured by DENISSEN Ltd.) having high pressure resistance by adjusting the cell temperature to be 30° C. The respective gas permeabilities of $CO_2$ and $CH_4$ were measured by TCD detection type gas chromatography by adjusting the total pressure on the gas supply side of a mixed gas, in which the volume ratio of carbon dioxide ($CO_2$) to methane ($CH_4$) was set to 6:94, to 5 MPa (partial pressure of $CO_2$: 0.65 MPa). The gas separation selectivity ($CO_2/CH_4$

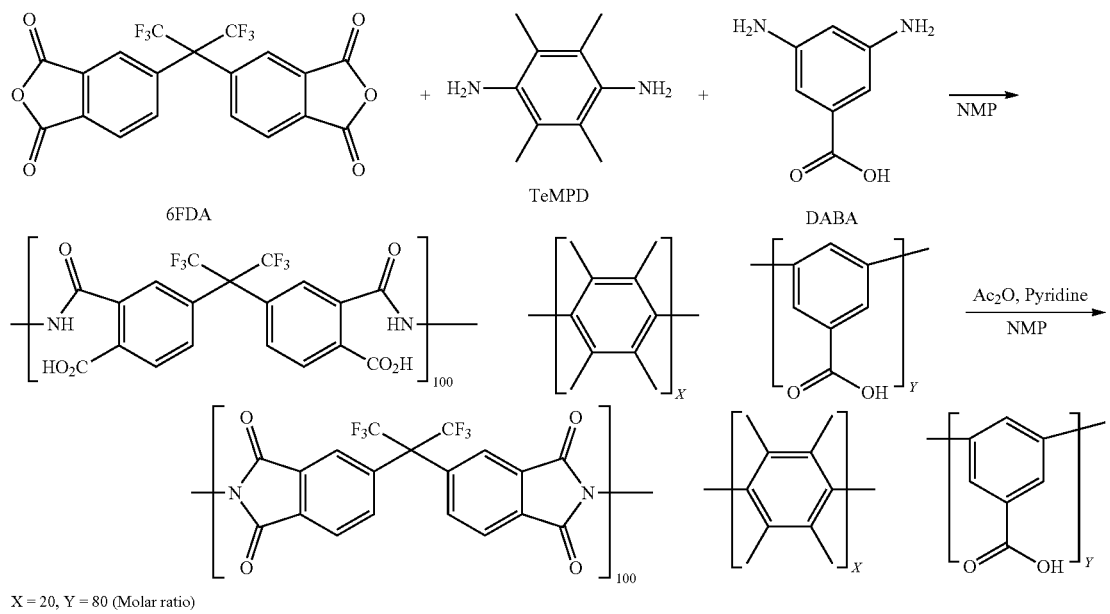

X = 20, Y = 80 (Molar ratio)

123 ml of N-methylpyrrolidone and 54.97 g (0.124 mol) of 6FDA (4,4'-(hexafluoroisopropylidene)diphthalic acid anhydride, manufactured by Tokyo Chemical Industry Co., Ltd.) were added to a three-neck flask, dissolved at 40° C., and stirred under a nitrogen stream. A solution obtained by dissolving 4.098 g (0.0248 mol) of 2,3,5,6-tetramethylphenylenediamine (manufactured by Tokyo Kasei Kogyo Co., Ltd., product number: T1457), and 15.138 g (0.0992 mol) of 3,5-diaminobenzoic acid in 84.0 ml of N-methylpyrrolidone was added dropwise to the above-described solution for 30 minutes while the temperature in the system was maintained gas separation selectivity) of the gas separation membranes of each of Examples and Comparative Examples was calculated as a ratio ($P_{CO2}/P_{CH4}$) of the permeability coefficient $P_{CO2}$ of $CO_2$ to the permeability coefficient $P_{CH4}$ of $CH_4$ of this membrane. The $CO_2$ permeability of the gas separation membrane of each of Examples and Comparative Examples was set as the permeability $Q_{CO2}$ (unit: GPU) of $CO_2$ of this membrane.

In addition, the unit of gas permeability was expressed by the unit of GPU [1 GPU=1×10$^{-6}$ cm$^3$(STP)/cm$^2$·sec·cmHg] representing the permeation flux (also referred to as permeation rate, permeability, and Permeance) per pressure difference or the unit of barrer [1 barrer=1×10⁻¹⁰ cm³(STP)·cm/cm²·sec·cmHg] representing the permeability coefficient. In the present specification, the symbol Q is used to represent a case of the unit of GPU and the symbol P is used to represent a case of the unit of barrer.

A: The $CO_2$ separation selectivity was increased compared to Comparative Example 1.

B: The $CO_2$ separation selectivity was equal to Comparative Example 1 or decreased by less than 20% compared to Comparative Example 1.

D: The $CO_2$ separation selectivity was decreased by 20% or more compared to Comparative Example 1.

The obtained results are shown in Tables 3 to 5 below.

<Decrease in Gas Separation Selectivity after Exposure to Impurity Gas>

The four sides of the gas separation membrane 10 of each of Examples and Comparative Examples were attached to an aluminum plate 21 with a KAPTON tape 22 (650S #25, manufactured by TERAOKA SEISAKUSHO CO., LTD.) such that the support side was directed to the aluminum plate 21 side, and as shown in FIG. 3, and the support side was sealed no to be exposed to toluene vapor so that a sample was prepared. Thereafter, the sample was placed in a sealed container filled with toluene saturated vapor at 25° C. and allowed to stand for 4 hours to swell the gas separation membrane with toluene.

Then, the gas separation membrane 10 was peeled off from the aluminum plate 21 and a test for gas separation selectivity was performed within 30 minutes.

The results after toluene swelling were compared with the results of other test pieces tested for gas separation selectivity without toluene swelling and evaluated according to the following standards.

A: A decrease ratio of gas separation selectivity after toluene swelling was less than 30%.

B: A decrease ratio of gas separation selectivity after toluene swelling was 30% or more and less than 70%.

D: A decrease ratio of gas separation selectivity after toluene swelling was 70% or more.

The obtained results of decrease in gas separation selectivity after exposure to an impurity gas (decrease in gas separation selectivity after toluene swelling) are shown in Tables 3 to 5 below.

<Gas Permeability>

Based on the results of $CO_2$ permeability measured in the evaluation of gas separation selectivity, the gas permeability of the gas separation membrane of each of Examples and Comparative Examples was evaluated using the following standards.

A: The $CO_2$ permeability was decreased by less than 20% compared to Comparative Example 1.

B: The $CO_2$ permeability was decreased by 20% or more and less than 50% compared to Comparative Example 1.

C: The $CO_2$ permeability was decreased by 50% or more compared to Comparative Example 1.

The obtained results are shown in Tables 3 to 5 below.

<Rub Resistance>

The gas separation membrane of each of Examples and Comparative Examples was tested for rub resistance by the following method and evaluated according to the following standards.

An operation of putting BEMCOT on a 5 cm square sample, putting a 300 g weight thereon, and moving the BEMCOT on the sample by pulling the BEMCOT was set to one rubbing operation.

A: No defects were generated when the sample was rubbed with BEMCOT (trade name: BEMCOT M-1, manufactured by Asahi Kasei Corporation) 10 times or more.

B: No defects were generated when the sample was rubbed with BEMCOT 3 times and defects were generated when the sample was rubbed with BEMCOT 4 to 9 times.

C: Defects were generated when the sample was rubbed with BEMCOT 3 times.

The term "defects" in the test refers to the fact that the pressure at the time of evaluation of gas separation selectivity was not raised to 5 MPa and the pressure was not held.

The obtained results are shown in Table 3 to 5 below.

<Higher Order Hydrocarbon Gas Separation Selectivity after Lapse of Time>

Similarly to the evaluation of gas separation selectivity, the gas separation membrane of each of Examples and Comparative Examples was set in a gas permeability tester, and a gas having a gas composition shown in Table 2 below was allowed to flow for 1 day.

TABLE 2

|  | Compositional ratio (% by volume) |
|---|---|
| $CO_2$ | 13 |
| $CH_4$ | 82.333 |
| C3 (propane) | 2.5 |
| C4 (total of n-butane and isobutene) | 1.583 |
| Toluene | 0.047 |
| Benzene | 0.023 |
| Xylene | 0.014 |

Thereafter, the gas permeability of each component was measured using a soap membrane flow meter and gas chromatography as in the evaluation of gas separation selectivity.

The $CO_2$/C3 gas separation selectivity was calculated as a ratio ($P_{CO2}/P_{C3}$) of a $CO_2$ permeability coefficient $P_{CO2}$ to a permeability coefficient $P_{C3}$ of C3 (propane) of this membrane.

The $CO_2$/C4 gas separation selectivity was calculated as a ratio ($P_{CO2}/P_{C4}$) of a $CO_2$ permeability coefficient $P_{CO2}$ to a permeability coefficient $P_{C4}$ of C4 (total of n-butane and isobutene) of this membrane.

Based on the results of the $CO_2$/C3 gas separation selectivity and the $CO_2$/C4 gas separation selectivity, the higher order hydrocarbon gas separation selectivity after the lapse of time was evaluated using the following standards.

A: Both the $CO_2$/C3 gas separation selectivity and the $CO_2$/C4 gas separation selectivity were increased by 10 or more compared to Comparative Example 1.

B: One of the $CO_2$/C3 gas separation selectivity and the $CO_2$/C4 gas separation selectivity was increased by 10 or more and the other was increased by less than 10 compared to Comparative Example 1.

C: One of the $CO_2$/C3 gas separation selectivity and the $CO_2$/C4 gas separation selectivity was decreased or not changed compared to Comparative Example 1, or Both the $CO_2$/C3 gas separation selectivity and the $CO_2$/C4 gas separation selectivity were increased by less than 10 compared to Comparative Example 1.

D: Other than A, B, and C.

The obtained results are shown in Table 3 to 5 below.

TABLE 3

|  |  | Comparative Example 1 | Comparative Example 2 | Example 1 | Example 2 | Example 3 | Example 4 | Example 5 | Example 6 | Example 7 | Example 8 |
|---|---|---|---|---|---|---|---|---|---|---|---|
| First separation layer | Resin | PI (P-02) | PI (P-02) | PI (P-02) | PI (P-02) | PI (P-02) | PI (P-02) | PI (P-02) | PI (P-02) | PI (P-02) | PI (P-02) |
|  | Thickness | 70 nm | 70 nm | 70 nm | 70 nm | 70 nm | 70 nm | 70 nm | 70 nm | 70 nm | 70 nm |
|  | Si/C ratio | 0 | 0 | 0 | 0 | 0 | 0 | 0 | 0 | 0 | 0 |
| Second separation layer | Resin or monomer | — | PTMSP | LINC-3A | LINC-3A | LINC-3A | LINC-3A | LINC-3A | LINC-3A | Bifunctional F | CYTOP |
|  | Polymerization initiator | — | — | Irg 127 | Irg 127 | Irg 127 | Irg 127 | Irg 127 | Irg 127 | Irg 127 | Not used |
|  | Concentration of solid contents of polymerization initiator [% by mass] | — | — | 3 | 3 | 3 | 3 | 3 | 3 | 3 | — |
|  | Thickness | — | 80 nm | 20 nm | 30 nm | 40 nm | 60 nm | 80 nm | 100 nm | 40 nm | 40 nm |
|  | F/C ratio | — | 0 | 0.45 | 0.45 | 0.45 | 0.45 | 0.45 | 0.45 | 0.67 | 1.6 |
|  | Si/C ratio | — | 0 | 0 | 0 | 0 | 0 | 0 | 0 | 0 | 0 |
|  | Free volume diameter (nm) | — | 0.82 | 0.62 | 0.62 | 0.62 | 0.62 | 0.62 | 0.62 | 0.68 | 0.81 |
|  | Insolubility in organic solvent | — | C | A | A | A | A | A | A | A | A |
| Protective layer | Resin | PDMS | PDMS | PDMS | PDMS | POMS | PDMS | PDMS | PDMS | PDMS | — |
| Evaluation | Gas separation selectivity | — | A | A | A | A | A | A | A | A | A |
|  | Decrease in gas separation selectivity after exposure to impurity gas | D | D | B | A | A | A | A | A | A | A |
|  | Gas permeability | — | A | A | A | A | A | A | B | A | A |
|  | Rub resistance | C | B | A | A | A | A | A | A | A | B |
|  | Higher order hydrocarbon gas separation selectivity after lapse of time | — | C | A | A | A | A | A | A | A | A |

TABLE 4

|  |  | Example 9 | Example 10 | Example 11 | Example 12 | Example 13 | Comparative Example 3 | Comparative Example 4 | Comparative Example 5 |
|---|---|---|---|---|---|---|---|---|---|
| First separation layer | Resin | PI (P-02) | PI (P-02) | PI (P-02) | PI (P-02) | PI (P-02) | — | — | — |
|  | Thickness | 70 nm | 70 nm | 70 nm | 70 nm | 70 nm | — | — | — |
|  | Si/C ratio | 0 | 0 | 0 | 0 | 0 | — | — | — |
| Second separation layer | Resin or monomer | FLUO-NATE | FLUO-NATE | FLUO-NATE | FLUO-NATE | FLUO-NATE | LINC-3A | FLUO-NATE | CYTOP |
|  | Polymerization initiator | BURNOCK DN-980 | BURNOCK DN-980 | BURNOCK DN-980 | BURNOCK DN-980 | Not used | Irg 127 | Not used | Not used |
|  | Concentration of solid contents of polymerization initiator [% by mass] | 20 | 10 | 3 | 1 | — | 3 | — | — |
|  | Thickness | 70 nm | 70 nm | 70 nm | 70 nm | 70 nm | 40 nm | 70 nm | 40 nm |
|  | F/C ratio | 0.25 | 0.25 | 0.25 | 0.25 | 0.25 | 0.45 | 0.25 | 1.6 |
|  | Si/C ratio | 0 | 0 | 0 | 0 | 0 | 0 | 0 | 0 |
|  | Free volume diameter (nm) | 0.55 | 0.6 | 0.65 | 0.71 | 0.75 | 0.62 | 0.75 | 0.81 |
|  | Insolubility in organic solvent | A | A | A | A | C | A | A | A |
| Protective layer | Resin | PDMS | PDMS | PDMS | PDMS | PDMS | PDMS | PDMS | — |
| Evaluation | Gas separation selectivity | A | A | A | A | B | D | D | D |

TABLE 4-continued

|  | Example 9 | Example 10 | Example 11 | Example 12 | Example 13 | Comparative Example 3 | Comparative Example 4 | Comparative Example 5 |
|---|---|---|---|---|---|---|---|---|
| Decrease in gas separation selectivity after exposure to impurity gas | A | A | A | A | B | A | B | A |
| Gas permeability | B | A | A | A | A | A | A | A |
| Rub resistance | A | A | A | A | B | A | A | B |
| Higher order hydrocarbon gas separation selectivity after lapse of time | A | A | A | A | A | A | A | A |

TABLE 5

| | | Example 14 | Example 15 | Comparative Example 6 | Comparative Example 7 | Example 16 | Comparative Example 8 | Example 17 | Example 18 | Example 19 | Example 20 |
|---|---|---|---|---|---|---|---|---|---|---|---|
| First separation layer | Resin | PI (P-02) | PI (P-02) | PI (P-02) | PI (P-02) | PI (P-02) | PI (P-101) | PI (P101) | PI (P-101) | PI (P-101) | PI (P-101) |
| | Thickness | 70 nm | 70 nm | 70 nm | 70 nm | 70 nm | 70 nm | 70 nm | 70 nm | 70 nm | 70 nm |
| | Si/C ratio | 0 | 0 | 0 | 0 | 0 | 0 | 0 | 0 | 0 | 0 |
| Second separation layer | Resin or monomer | LINC-3A (80)/FM 7721(20) | LINC-3A (50)/FM 7721(50) | LINC-3A (20)/FM 7721(80) | FM7721 | RS-75 | — | LINC-3A | LINC-3A | FLUO-NATE | FLUO-NATE |
| | Polymerization initiator | Irg 127 | Irg 127 | Irg 127 | Irg 127 | — | — | Irg 127 | Irg 127 | BURNOCK DN-980 | BURNOCK DN-980 |
| | Concentration of solid contents of polymerization initiator [% by mass] | 3 | 3 | 3 | 3 | — | — | 3 | 3 | 3 | 1 |
| | Thickness | 40 nm | 40 nm | 40 nm | 40 nm | 5 nm | — | 30 nm | 40 nm | 70 nm | 70 nm |
| | F/C ratio | 0.45 | 0.4 | 0.3 | 0 | 0.3 | — | 0.45 | 0.45 | 0.25 | 0.25 |
| | Si/C ratio | 0.1 | 0.25 | 0.4 | 0.5 | 0 | — | 0 | 0 | 0 | 0 |
| | Free volume diameter (nm) | 0.62 | 0.62 | 0.62 | 0.84 | — | — | 0.62 | 0.62 | 0.65 | 0.71 |
| | Insolubility in organic solvent | A | A | A | A | C | — | A | A | A | A |
| Protective layer | Resin | PDMS | PDMS | PDMS | PDMS | PDMS | PDMS | PDMS | PDMS | PDMS | PDMS |
| Evaluation | Gas separation selectivity | A | A | A | A | A | B | A | A | A | A |
| | Decrease in gas separation selectivity after exposure to impurity gas | A | A | D | D | B | D | A | A | A | A |
| | Gas permeability | A | A | A | A | A | B | B | B | B | B |
| | Rub resistance | A | A | A | C | B | C | A | A | A | A |
| | Higher order hydrocarbon gas separation selectivity after lapse of time | A | A | D | D | B | C | A | A | A | A |

From Tables 3 to 5 above, it was found that the gas separation membrane of the present invention had high gas separation selectivity and was suppressed in decrease of gas separation selectivity after exposure to an impurity gas. In a case where a fluoroacrylate polymer derived from LINC-3A or bifunctional F was used as the second separation layer, particularly, at a thickness of the second separation layer of 30 to 80 nm, all the evaluations were A. In addition, in a case where a fluoroolefin polymer derived from CYTOP or FLUONATE (copolymer of fluoroolefin and isocyanate) was used as the second separation layer and a polymerization initiator (a curing agent which is isocyanate) having a concentration of solid contents of 1% to 10% by mass with respect to the precursor of the fluoroolefin polymer was used in the composition for forming a second separation layer, all the evaluations were A.

On the other hand, from Comparative Example 1, it was found that in a case where the second separation layer was not provided, the gas separation selectivity after exposure to an impurity gas was significantly decreased.

From Comparative Example 2, it was found that in a case where the maximum value of the F/C ratio of the second separation layer was lower than the lower limit defined in the present invention, the gas separation selectivity after exposure to an impurity gas was significantly decreased.

From Comparative Examples 3 to 5, it was found that in a case where the first separation layer was not provided, the gas separation selectivity ($CO_2/CH_4$ gas separation selectivity) was low. However, the gas separation membranes of Comparative Examples 3 to 5 exhibited a certain degree of gas separation selectivity and the second separation layer formed in Comparative Examples 3 to 5 was a "layer having separation selectivity" defined in the present specification.

From Comparative Example 6, it was found that in a case where the Si/C ratio of the second separation layer was more the upper limit defined in the present invention, the gas separation selectivity after exposure to an impurity gas was significantly decreased.

From Comparative Example 7, it was found that in a case where the maximum value of the F/C ratio of the second separation layer was lower than the lower limit defined in the present invention and the Si/C ratio of the second separation layer was more than the upper limit defined in the present invention, the gas separation selectivity after exposure to an impurity gas was significantly decreased.

It was found that in the gas separation membrane of each of Examples and Comparative Examples, from the materials used in each gas separation membrane, the resin of the second separation layer included an acrylic ester bond, a methacrylic ester bond, a urethane bond, and an ether bond.

Examples 101 to 120

<Made into Modules>

Spiral type modules were prepared using the gas separation membranes prepared in Examples 1 to 20 with reference to paragraphs <0012> to <0017> of JP1993-168869A (JP-H05-168869A). The obtained gas separation membrane modules were made into gas separation membrane modules of Examples 101 to 120.

It was confirmed that the prepared gas separation membrane modules of the respective Examples were excellent based on the performance of the gas separation membrane incorporated therein.

In the prepared gas separation membrane modules of the respective Examples, ten portions having a size of 1 cm×1 cm were randomly collected from the center of one surface of a leaf (leaf indicates a portion of a gas separation membrane in which the space on the permeation side in the spiral type module is connected to the central tube and which is folded into an envelope shape) with a size of 10 cm×10 cm and the element ratios of the surface in the depth direction were calculated according to the method of Example 1, and then the modules were confirmed to have the performance as understood from the separation membranes incorporated therein based on nine or more out of ten portions. It was confirmed that the spiral type modules were excellent as the performance of the gas separation membranes incorporated therein.

EXPLANATION OF REFERENCES

3: first separation layer
4: support
8: second separation layer
9: protective layer
10: gas separation membrane
21: aluminum plate
22: KAPTON tape

What is claimed is:

1. A gas separation membrane comprising:
a first separation layer; and
a second separation layer,
wherein the first separation layer has an Si/C ratio of 0.3 or less, the Si/C ratio being a ratio of the number of silicon atoms to the number of carbon atoms at an interface of the first separation layer on a second separation layer side, and
the second separation layer has a maximum value of an F/C ratio of 0.20 or more, the F/C ratio being a ratio of the number of fluorine atoms to the number of carbon atoms, and has an Si/C ratio of 0.3 or less in a portion where the F/C ratio is maximum.

2. The gas separation membrane according to claim 1, wherein the second separation layer and the first separation layer are disposed in this order from a side to which a gas is supplied.

3. The gas separation membrane according to claim 1, wherein the second separation layer has a thickness of 20 to 200 nm.

4. The gas separation membrane according to claim 1, wherein the second separation layer has a free volume diameter of 0.6 nm or more.

5. The gas separation membrane according to claim 1, wherein the second separation layer is insoluble in an organic solvent consisting of toluene and heptane at a compositional ratio of 1:1 by mass ratio.

6. The gas separation membrane according to claim 1, wherein the second separation layer includes a resin, and the second separation layer includes at least one of a fluoro(meth)acrylate polymer or a fluoroolefin polymer as the resin of the second separation layer.

7. The gas separation membrane according to claim 1, wherein the second separation layer includes a resin, and the resin of the second separation layer includes at least one of an acrylic ester bond, a methacrylic ester bond, a urethane bond, or an ether bond.

8. The gas separation membrane according to claim 1, wherein the second separation layer includes a fluorine-containing surfactant.

9. The gas separation membrane according to claim 1, wherein the first separation layer includes a resin, and the resin of the first separation layer is cellulose or polyimide.

10. The gas separation membrane according to claim 9, wherein the resin of the first separation layer is a polyimide having a structure derived from 4,4'-(hexafluoroisopropylidene)diphthalic acid anhydride.

11. The gas separation membrane according to claim 9, wherein the resin of the first separation layer is a polyimide including a sulfonamide group.

12. The gas separation membrane according to claim 1 further comprising:
a protective layer,
wherein the protective layer includes a compound having a siloxane bond.

13. The gas separation membrane according to claim 12, wherein the protective layer is in direct contact with the second separation layer, and
the protective layer and the second separation layer are disposed in this order from a side to which a gas is supplied.

14. The gas separation membrane according to claim 1 further comprising:
a protective layer,
wherein the protective layer includes a compound having a siloxane bond,
the resin of the first separation layer is a polyimide having a structure derived from 4,4'-(hexafluoroisopropylidene)diphthalic acid anhydride,
the second separation layer includes a resin,
the resin of the second separation layer includes at least one of an acrylic ester bond, a methacrylic ester bond, a urethane bond, or an ether bond,
the protective layer is in direct contact with the second separation layer, and
the protective layer and the second separation layer are disposed in this order from a side to which a gas is supplied.

15. The gas separation membrane according to claim 1 further comprising:
a protective layer,
wherein the protective layer includes a compound having a siloxane bond,
the resin of the first separation layer is a polyimide having a structure derived from 4,4'-(hexafluoroisopropylidene)diphthalic acid anhydride,
the resin of the first separation layer is a polyimide including a sulfonamide group,
the second separation layer includes a resin,
the second separation layer includes at least one of a fluoro(meth)acrylate polymer or a fluoroolefin polymer as the resin of the second separation layer,
the protective layer is in direct contact with the second separation layer, and
the protective layer and the second separation layer are disposed in this order from a side to which a gas is supplied.

16. A gas separation membrane module comprising:
the gas separation membrane according to claim 1.

17. A gas separation device comprising:
the gas separation membrane module according to claim 16.

* * * * *